United States Patent
Oh

(10) Patent No.: US 12,304,521 B2
(45) Date of Patent: May 20, 2025

(54) AUTONOMOUS DRIVING CONTROL APPARATUS AND METHOD THEREOF

(71) Applicants: Hyundai Motor Company, Seoul (KR); Kia Corporation, Seoul (KR)

(72) Inventor: Tae Dong Oh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 516 days.

(21) Appl. No.: 17/822,969

(22) Filed: Aug. 29, 2022

(65) Prior Publication Data

US 2023/0182768 A1    Jun. 15, 2023

(30) Foreign Application Priority Data

Dec. 14, 2021  (KR) .................. 10-2021-0178962

(51) Int. Cl.
*B60W 60/00*  (2020.01)
*B60W 50/00*  (2006.01)
(Continued)

(52) U.S. Cl.
CPC .......... *B60W 60/001* (2020.02); *B60W 50/04* (2013.01); *G06F 9/3851* (2013.01);
(Continued)

(58) Field of Classification Search
CPC ............... B60W 60/001; B60W 50/04; B60W 2050/0005; B60W 2556/20;
(Continued)

(56) References Cited

U.S. PATENT DOCUMENTS

| | | | |
|---|---|---|---|
| 10,176,208 B2* | 1/2019 | Chen | G06F 16/2322 |
| 2008/0005391 A1* | 1/2008 | Gedik | H04L 49/90 |
| | | | 710/29 |

(Continued)

OTHER PUBLICATIONS

Ali et al. (Scalability Management in Sensor-Network PhenomenaBases), Department of Computer Science, Purdue University, Nov. 18, 2006. (Year: 2006).*

*Primary Examiner* — Abby J Flynn
*Assistant Examiner* — Kyle J Kingsland
(74) *Attorney, Agent, or Firm* — Slater Matsil, LLP

(57) ABSTRACT

An autonomous driving control apparatus includes a sensor device obtaining information around an autonomous vehicle and including a plurality of sensors, a memory storing information about a high definition map around the autonomous vehicle, and a controller classifying the sensors into at least one sensor set based on the information around the autonomous vehicle and the information about the high definition map, using a sensor set classification table, monitoring a computational resource utilization rate and a resource occupancy rate of the memory, calculating a determiner input drop rate and determining whether there is an available resource, using the monitored computational resource utilization rate and the monitored resource occupancy rate, determining whether to additionally allocate at least one determiner using the determiner input drop rate and whether there is the available resource, and changing an autonomous driving determination period.

20 Claims, 15 Drawing Sheets

(51) Int. Cl.
  *B60W 50/04* (2006.01)
  *G06F 9/38* (2018.01)
(52) U.S. Cl.
  CPC . *B60W 2050/0005* (2013.01); *B60W 2556/20* (2020.02); *B60W 2556/30* (2020.02); *B60W 2556/35* (2020.02); *B60W 2556/40* (2020.02)
(58) Field of Classification Search
  CPC ......... B60W 2556/30; B60W 2556/35; B60W 2556/40; B60W 2420/00; B60W 60/00; B60W 40/02; B60W 2050/0002; G06F 9/3851; B60Y 2400/30
  See application file for complete search history.

(56) References Cited

U.S. PATENT DOCUMENTS

2015/0207749 A1* 7/2015 Cao .................. H04L 65/61
    709/226
2015/0334599 A1* 11/2015 Maaref ................ H04W 72/20
    370/236

\* cited by examiner

| SENSOR SET | SENSOR INPUT VALUE PROCESSING POLICY | | DRIVING SITUATION | |
|---|---|---|---|---|
| | | | CITY (SHORT PERIOD OF PEDESTRIAN INTRUSION, TWO-WHEELED VEHICLE, OR THE LIKE, SHORT-RANGE SENSING IS REQUIRED) | HIGHWAY (LONG PERIOD DUE TO RELATIVELY STATIC CHANGE IN SITUATION, CHANGE IN SITUATION, REQUIRED DUE TO HIGH-SPEED DRIVING) |
| SENSOR SET 1 | PERIOD OF 300 ms | LIDAR | – | FRONT (LONG-RANGE) |
| | | RADAR | – | FRONT (LONG-RANGE) |
| | | CAMERA | – | FRONT (STEREO) |
| SENSOR SET 2 | PERIOD OF 200 ms | LIDAR | FRONT (MID- TO LONG-RANGE)/FRONT SIDE (MID-RANGE) | FRONT (MID-RANGE)/FRONT SIDE (MID- TO LONG-RANGE)/REAR |
| | | RADAR | FRONT (LONG-RANGE)/FRONT SIDE (LONG-RANGE) | FRONT (MID- TO LONG-RANGE)/FRONT SIDE |
| | | CAMERA | FRONT | FRONT |
| SENSOR SET 3 | PERIOD OF 100 ms | LIDAR | OMNIDIRECTIONAL (LOOP LIDAR) | FRONT SIDE (MID-RANGE)/REAR SIDE (MID-RANGE) |
| | | RADAR | FRONT (MID-RANGE)/FRONT SIDE (MID-RANGE) | FRONT SIDE/REAR SIDE |
| | | CAMERA | FRONT/FRONT SIDE | FRONT SIDE |
| SENSOR SET 4 | PERIOD OF 50 ms | RADAR | FRONT SIDE (MID-RANGE)/REAR SIDE (MID-RANGE) | – |
| | | CAMERA | FRONT SIDE/REAR SIDE/SVM | – |

Fig.5

AUTONOMOUS DRIVING CONTROL APPARATUS AND METHOD THEREOF

CROSS-REFERENCE TO RELATED APPLICATIONS

This application claims the benefit of Korean Patent Application No. 10-2021-3178962, filed on Dec. 14, 2021, which application is hereby incorporated herein by reference.

TECHNICAL FIELD

The present disclosure relates to an autonomous driving control apparatus and a method thereof.

BACKGROUND

An autonomous vehicle according to an existing technology may determine an autonomous driving determination period based on a maximum period among periods of a plurality of sensors. In this case, a gap may occur with respect to a determination based on the measured results of some sensors in a situation where a determination period should be measured at a short period.

Particularly, because a plurality of modules included in the autonomous vehicle have different processing times, a data bottleneck phenomenon may occur. Furthermore, in an existing autonomous vehicle, due to a difference between a processing time of a sensor and a processing time of a determiner, a drop phenomenon where some pieces of sensing data are not used occurs or an unnecessary idle time of the determiner occurs. Thus, there is a need to develop a technology for dynamically allocating a sensor and a determiner depending on a situation.

SUMMARY

The present disclosure relates to an autonomous driving control apparatus and a method thereof. Particular embodiments relate to an autonomous driving control apparatus for dynamically allocating a sensor and a determiner and changing an autonomous driving determination period of an autonomous vehicle and a method thereof.

Embodiments of the present disclosure can solve problems occurring in the prior art while advantages achieved by the prior art are maintained intact.

An embodiment of the present disclosure provides an autonomous driving control apparatus for dynamically allocating a sensor and a determiner and changing an autonomous driving determination period of an autonomous vehicle and a method thereof.

Another embodiment of the present disclosure provides an autonomous driving control apparatus for classifying a sensor set using sensor fusion domain information configured based on sensor fusion domain information to selectively select a sensor depending on a driving situation of an autonomous vehicle and perform a sensing operation and a method thereof.

Another embodiment of the present disclosure provides an autonomous driving control apparatus for performing an operation of dynamically and additionally allocating a determiner based on a determiner input drop rate and whether there is an available resource and a method thereof.

Another embodiment of the present disclosure provides an autonomous driving control apparatus for adaptively performing a processing procedure for determining autonomous driving in parallel using an extra idle resource (e.g., a determiner idle time) to increase resource utilization efficiency and a method thereof.

Another embodiment of the present disclosure provides an autonomous driving control apparatus for dividing a plurality of sensors into at least one sensor set based on a specified criterion and allocating at least one determiner corresponding to coverage of the at least one divided sensor set to reduce a determination calculation time and a method thereof.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, an autonomous driving control apparatus may include a sensor device that obtains information around an autonomous vehicle and includes at least one sensor, a storage storing information about a high definition map around the autonomous vehicle, and a controller that classifies the at least one sensor into at least one sensor set based on the information around the autonomous vehicle and the information about the high definition map, using a sensor set classification table, monitors a computational resource utilization rate and a resource occupancy rate of the storage based on a specified period, calculates or determines a determiner input drop rate and whether there is an available resource, using the monitored computational resource utilization rate and the monitored resource occupancy rate of the storage, determines whether to additionally allocate at least one determiner, using the calculated determiner input drop rate and whether there is the available resource, and changes an autonomous driving determination period, based on the at least one classified sensor set and whether the at least one determiner is additionally allocated.

In an embodiment, the controller may configure and load the sensor set classification table based on sensor fusion domain information and may classify the at least one sensor into the at least one sensor set by applying the information around the autonomous vehicle and the information about the high definition map to the sensor set classification table. For example, the sensor fusion domain information may include information about whether there is redundancy of the at least one sensor, a measurement period, a measurement distance, and classification information according to at least one driving situation of the autonomous vehicle.

In an embodiment, the controller may determine whether there is the redundancy of the at least one sensor, using information about whether there is the redundancy of the at least one sensor, and may classify sensors of a first group according to a determination that there is the redundancy into different sensor sets, respectively.

In an embodiment, the controller may identify a measurement period of the at least one sensor and may classify sensors of a second group identified as having a period of a specified value or less among the at least one sensor into different sensor sets, respectively.

In an embodiment, the controller may divide the at least one sensor into a first sensor corresponding to a first situation among the at least one driving situation and a second sensor corresponding to a second situation different from the first situation and may classify the first sensor and the second sensor into different sensor sets, respectively.

In an embodiment, the controller may calculate the determiner input drop rate, using the fusion number of sensor sets for processing a process, an input drop time point, and a drop data buffer, and may additionally allocate the at least one determiner, when the calculated determiner input drop rate is greater than a specified value.

In an embodiment, the controller may determine that there is the available resource, when the computational resource utilization rate of the autonomous vehicle is less than or equal to a predetermined threshold, and may additionally allocate the at least one determiner in parallel, based on determining that there is the available resource.

In an embodiment, the controller may determine that there is the available resource, when the resource occupancy rate of the storage is less than or equal to a predetermined threshold, and may additionally allocate the at least one determiner in parallel, based on determining that there is the available resource.

In an embodiment, the controller may process a first process and a second process in parallel, using a plurality of determiners including a first determiner and a second determiner, based on whether the at least one determiner is additionally allocated, and may transmit first output data through the first process and second output data through the second process to the storage and an external device.

In an embodiment, the controller may process the first output data by means of the first determiner, based on receiving the second output data from the external device. For example, a first determination period of the first determiner may be greater than a second determination period of the second determiner.

According to another embodiment of the present disclosure, an autonomous driving control method may include obtaining, by a sensor device, information around an autonomous vehicle, classifying, by a controller, at least one sensor into at least one sensor set based on the information around the autonomous vehicle and information about a high definition map around the autonomous vehicle, using a sensor set classification table, monitoring, by the controller, a computational resource utilization rate of the controller and a resource occupancy rate of a storage based on a specified period, calculating or determining, by the controller, a determiner input drop rate and whether there is an available resource, using the monitored computational resource utilization rate and the monitored resource occupancy rate of the storage, determining, by the controller, whether to additionally allocate at least one determiner, using the calculated determiner input drop rate and whether there is the available resource, and changing, by the controller, an autonomous driving determination period, based on the at least one classified sensor set and whether the at least one determiner is additionally allocated.

In an embodiment, the classifying of the at least one sensor into the at least one sensor set by the controller may include configuring and loading the sensor set classification table based on sensor fusion domain information and classifying the at least one sensor into the at least one sensor set by applying the information around the autonomous vehicle and the information about the high definition map to the sensor set classification table. For example, the sensor fusion domain information may include information about whether there is redundancy of the at least one sensor, a measurement period, a measurement distance, and classification information according to at least one driving situation of the autonomous vehicle.

In an embodiment, the classifying of the at least one sensor into the at least one sensor set by the controller may further include determining whether there is the redundancy of the at least one sensor, using information about whether there is the redundancy of the at least one sensor, and classifying sensors of a first group according to a determination that there is the redundancy of the at least one sensor into different sensor sets, respectively.

In an embodiment, the classifying of the at least one sensor into the at least one sensor set by the controller may further include identifying a measurement period of the at least one sensor and classifying sensors of a second group identified as having a period of a specified value or less among the at least one sensor into different sensor sets, respectively.

In an embodiment, the classifying of the at least one sensor into the at least one sensor set by the controller may further include dividing the at least one sensor into a first sensor corresponding to a first situation among the at least one driving situation and a second sensor corresponding to a second situation different from the first situation and classifying the first sensor and the second sensor into different sensor sets, respectively.

In an embodiment, the determining of whether to additionally allocate the at least one determiner by the controller may include calculating the determiner input drop rate, using the fusion number of sensor sets for processing a process, an input drop time point, and a drop data buffer, and additionally allocating the at least one determiner, when the calculated determiner input drop rate is greater than a specified value.

In an embodiment, the determining of whether to additionally allocate the at least one determiner by the controller may include determining that there is the available resource, when the computational resource utilization rate of the autonomous vehicle is less than or equal to a predetermined threshold, and additionally allocating the at least one determiner in parallel, based on determining that there is the available resource.

In an embodiment, the determining of whether to additionally allocate the at least one determiner by the controller may include determining that there is the available resource, when the resource occupancy rate of the storage is less than or equal to a predetermined threshold, and additionally allocating the at least one determiner in parallel, based on determining that there is the available resource.

In an embodiment, the autonomous driving control method may further include processing a first process and a second process in parallel, using a plurality of determiners including a first determiner and a second determiner, based on whether the at least one determiner is additionally allocated, and transmitting first output data through the first process and second output data through the second process to the storage and an external device.

In an embodiment, the autonomous driving control method may further include processing the first output data by means of the first determiner, based on receiving the second output data from the external device. For example, a first determination period of the first determiner may be greater than a second determination period of the second determiner.

BRIEF DESCRIPTION OF THE DRAWINGS

The above and other objects, features and advantages of embodiments of the present disclosure will be more apparent from the following detailed description taken in conjunction with the accompanying drawings, in which:

FIG. 5 is a drawing illustrating a result where an autonomous driving control apparatus classifies sensor sets according to an embodiment of the present disclosure;

DETAILED DESCRIPTION OF ILLUSTRATIVE EMBODIMENTS

Figure 1:
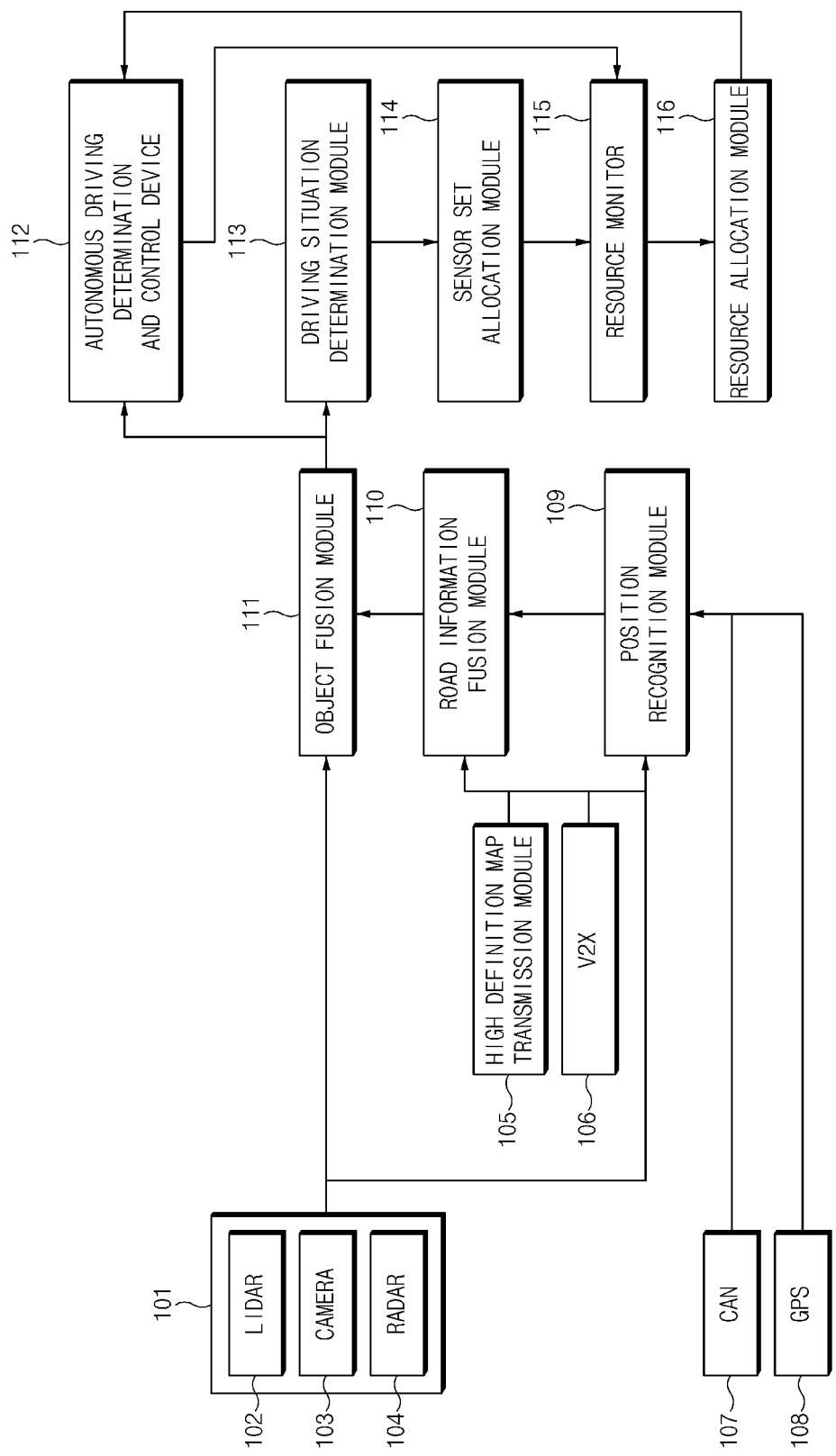
FIG. 1 is a drawing illustrating a detailed configuration and operation of an autonomous driving control apparatus according to an embodiment of the present disclosure.

Hereinafter, some embodiments of the present disclosure will be described in detail with reference to the accompanying drawings. In adding the reference numerals to the components of each drawing, it should be noted that the identical component is designated by the identical numerals even when they are displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein are to be interpreted as is customary in the art to which this invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 15. Furthermore, in a description of FIGS. 1 to 15, an operation described as being performed by an autonomous driving control apparatus may be understood as being performed or controlled by a controller included in the autonomous driving control apparatus.

FIG. 1 is a drawing illustrating a detailed configuration and operation of an autonomous driving control apparatus according to an embodiment of the present disclosure.

Referring to FIG. 1, the autonomous driving control apparatus may include a sensor device 101 including a light detection and ranging (LiDAR) 102, a camera 103, and a radar 104, a high definition map transmission module 105, vehicle to everything (V2X) 106, a controller area network (CAN) 107, a global positioning system (GPS) 108, a position recognition module 109, a road information fusion module no, an object fusion module 111, an autonomous driving determination and control device 112, a driving situation determination module 113, a sensor set allocation module 114, a resource monitor 115, and a resource allocation module 116. The components 109 to 116 may be implemented by means of a controller of an autonomous vehicle, and each module may be implemented in the form of software or hardware. Pieces of data obtained by means of the components 109 to 116 and/or pieces of data transmitted and received between the components 109 to 116 may be stored in a memory of the autonomous vehicle.

Recognition information about another vehicle, which is obtained by means of the LiDAR 102, the camera 103, and the radar 104 of the sensor device 101, may be transmitted to the object fusion module in and the position recognition module 109.

The high definition map transmission module 105 may transmit information about a high definition map around the autonomous vehicle to the road information fusion module no and the position recognition module 109.

The V2X 106 may transmit information about another vehicle, which is obtained through V2X communication, to the road information fusion module 110 and the position recognition module 109.

The position recognition module 109 may be communicatively connected with the CAN 107 of the autonomous vehicle to perform a communication function and may be connected with the GPS 108 of the autonomous vehicle to obtain position information of the autonomous vehicle.

The position recognition module 109 may compare the recognition information obtained by means of the sensor device 101, the information obtained by means of the GPS 108, and the high definition map information transmitted from the high definition map transmission module 105 and may output position information of the autonomous vehicle and reliability of position recognition together to be transmitted to the road information fusion module 110.

The road information fusion module 110 may output information about a high definition map around the autonomous vehicle, by means of the position recognition information and the high definition map information, to be transmitted to the object fusion module in.

The object fusion module 111 may fuse and output an object on the high definition map, by means of the recognition information obtained by means of the sensor device 101 and the information about the high definition map around the autonomous vehicle, which is received from the road information fusion module 110, and may transmit the output information to the autonomous driving determination and control device 112 and the driving situation determination module 113. As an example, the object may include another vehicle around the autonomous vehicle.

The autonomous driving determination and control device 112 may receive resource allocation information obtained from the resource allocation module 116. The autonomous driving determination and control device 112 may determine a driving strategy based on the received resource allocation information, a driving situation of the autonomous vehicle, and/or a global path to generate a driving path and a speed profile. For example, the autonomous driving determination and control device 112 may transmit information about an input drop time point and/or a drop data buffer generated in a procedure of an autonomous driving determination process to the resource monitor 115. For another example, the autonomous driving determination and control device 112 may transmit a current computational resource utilization rate and/or a storage resource occupancy rate.

The driving situation determination module 113 may determine a driving situation, based on information about a surrounding object obtained by means of the object fusion module 111 and/or a high definition map. For example, the driving situation determination module 113 may determine a driving situation further based on a current position of the autonomous vehicle.

The sensor set allocation module 114 may divide at least some of sensors of the sensor device 101 to form at least one sensor set. For example, the sensor set allocation module 114 may divide sensors based on sensor fusion domain information. For example, the sensor set allocation module 114 may generate a sensor set classification table using the sensor fusion domain information. The sensor fusion domain information may include information about whether there is redundancy of at least one sensor, a measurement period, a measurement distance, and/or classification information according to at least one driving situation of the autonomous vehicle. For example, the driving situation may be a city driving situation (e.g., a pedestrian intrusion situation and/or a situation where there is a two-wheeled vehicle on an adjacent area) and/or a highway driving situation (e.g., a more static situation than the city driving situation, a driving situation where the number of external objects is less than or equal to a specified number, and/or a situation where the vehicle travels a long distance at a speed of greater than a specified value).

As an example, the sensor set allocation module 114 may determine whether there is redundancy of at least one sensor using the information about whether there is the redundancy of the at least one sensor and may classify sensors of a first group based on a determination that there is the redundancy into different sensor sets, respectively. The sensor set allocation module 114 may classify at least some of sensors based on a determination that there is no redundancy into the same sensor set.

As an example, the sensor set allocation module 114 may identify a measurement period of at least one sensor and may classify sensors of a second group identified as having a period of a specified value or less among the at least one sensor into different sensor sets, respectively.

As an example, the sensor set allocation module 114 may classify at least one sensor into a first sensor corresponding to a first situation among driving situations and a second sensor corresponding to a second situation among the driving situations and may classify the first sensor and the second sensor into different sensor sets, respectively.

As an example, the sensor set allocation module 114 may identify a sensing coverage area of at least one sensor and may classify some of sensors which sense coverage of an adjacent area among the at least one sensor into the same sensor set.

The resource monitor 115 may receive the current computational resource utilization rate and the storage resource occupancy rate from the autonomous driving determination and control device 112. The resource monitor 115 may transmit the received current computational resource utilization rate and the received storage resource occupancy rate to the resource allocation module 116.

The resource allocation module 116 may determine whether to additionally allocate at least one determiner (e.g., processing resource), based on the current computational resource utilization rate and the storage resource occupancy rate received from the resource monitor 115. For example, the resource allocation module 116 may calculate and determine whether a determiner input drop rate and/or whether there is an available resource using the computational resource utilization rate and the storage resource occupancy rate and may determine whether to additionally allocate at least one determiner, using the calculated determiner input drop rate and whether there is the available resource. The resource allocation module 116 may transmit the determined result to the autonomous driving determination and control device 112.

Hereinafter, a description will be given in detail of an autonomous driving control method according to another embodiment of the present disclosure with reference to FIG. 2.

Figure 2:
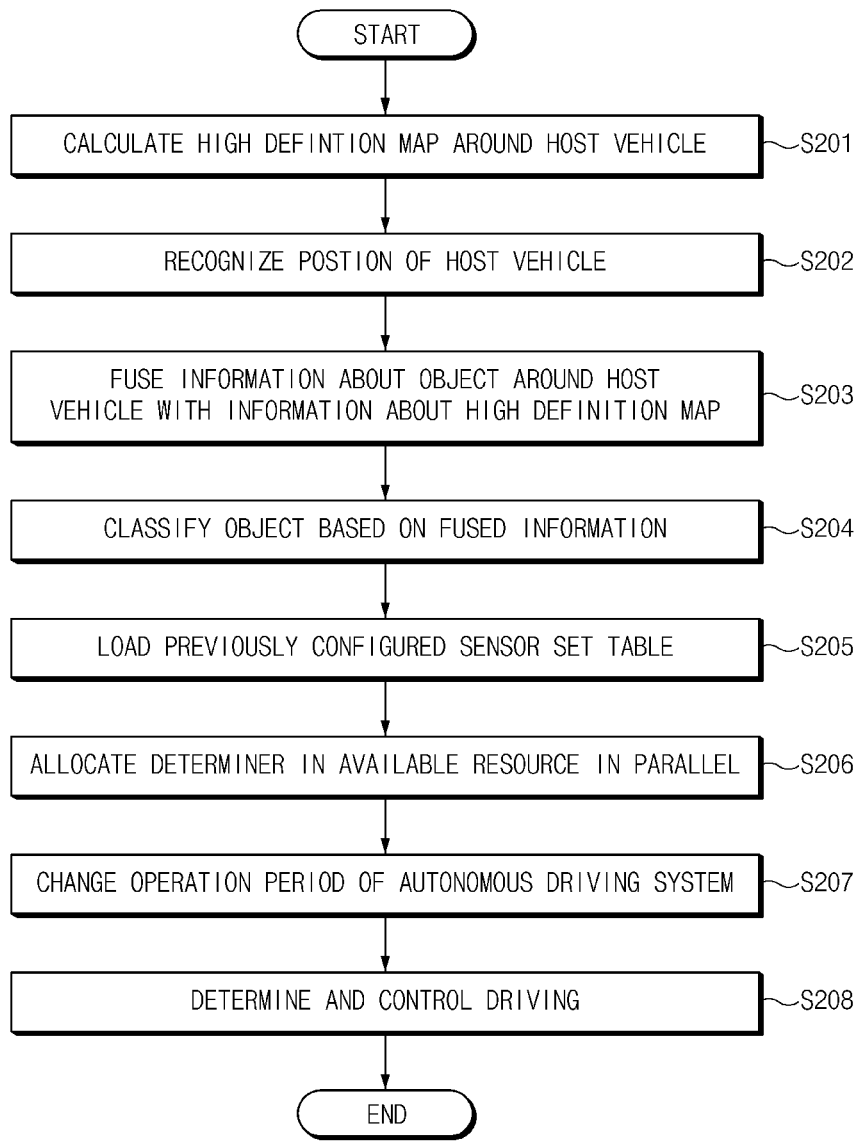
FIG. 2 is a flowchart illustrating an autonomous driving control method according to an embodiment of the present disclosure.

FIG. 2 is a flowchart illustrating an autonomous driving control method according to another embodiment of the present disclosure. Hereinafter, it is assumed that an autonomous driving control apparatus having the components of FIG. 1 performs a process of FIG. 2. Furthermore, in a description of FIG. 2, an operation described as being performed by the autonomous driving control apparatus may be understood as being controlled by a controller of the autonomous driving control apparatus of FIG. 1 and FIGS. 3 to 15.

Referring to FIG. 2, in S201, the autonomous driving control apparatus may obtain or calculate a high definition map around a host vehicle.

As an example, the autonomous driving control apparatus may receive high definition map information from a server.

After obtaining the high definition map information in S201, in S202, the autonomous driving control apparatus may recognize a position of the host vehicle.

As an example, the autonomous driving control apparatus may recognize a position of the host vehicle by means of a GPS provided in the host vehicle.

After recognizing the position of the host vehicle in S202, in S203, the autonomous driving control apparatus may fuse information about an object around the host vehicle with the high definition map information.

As an example, the autonomous driving control apparatus may fuse information about a position of the host vehicle and information about an object around the host vehicle with the high definition map information to generate fusion information capable of comparing and analyzing a map, the host vehicle, and the object together.

In S204, the autonomous driving control apparatus may perform an object classification operation using the fused information.

As an example, the autonomous driving control apparatus may classify an object associated with the host vehicle, using the high definition map information, the information about the position of the host vehicle, and the information about the object around the host vehicle.

Classifying the object in S204, in S205, the autonomous driving control apparatus may load a previously configured sensor set table.

As an example, the autonomous driving control apparatus may configure a sensor set table (or a sensor set classification table) based on sensor fusion domain information. For example, the sensor fusion domain information may include information about whether there is redundancy of at least one sensor, a measurement period, a measurement distance, a measurement range, and/or classification information according to at least one driving situation of the autonomous vehicle.

As an example, the autonomous driving control apparatus may classify at least one sensor into at least one sensor set based on surrounding information and high definition map information around the host vehicle, using the sensor set table.

In S206, the autonomous driving control apparatus may allocate a determiner in an available resource in parallel.

As an example, the autonomous driving control apparatus may monitor a computational resource utilization rate of a controller and a resource occupancy rate of a storage based on a specified period, may calculate or determine a determiner input drop rate and whether there is an available resource using the monitored pieces of information, and may determine whether to additionally allocate at least one determiner using the calculated result. When it is determined to add the at least one determiner, the autonomous driving control apparatus may allocate an additional determiner to an existing determiner in parallel in the available resource.

After allocating the determiner in parallel in S206, in S207, the autonomous driving control apparatus may change an operation period of an autonomous driving system.

As an example, the autonomous driving control apparatus may change the operation period of the autonomous driving system, based on the sensor set and at least one determiner configured in parallel.

After changing the period in S207, in S208, the autonomous driving control apparatus may perform a driving determination and control operation.

Figure 3:
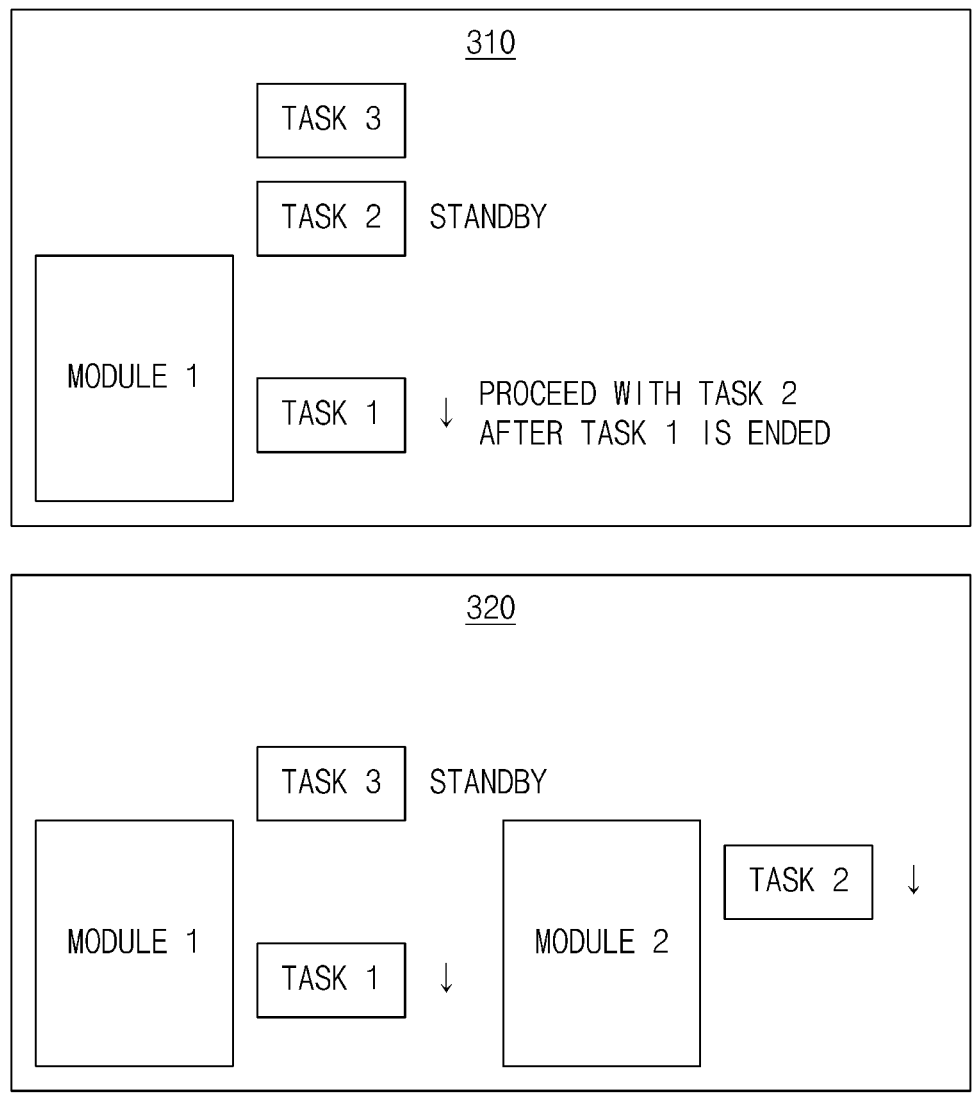
FIG. 3 is a drawing illustrating that an autonomous driving control apparatus processes a task in parallel using a plurality of modules according to an embodiment of the present disclosure.

FIG. 3 is a drawing illustrating that an autonomous driving control apparatus processes a task in parallel using a plurality of modules according to an embodiment of the present disclosure.

Referring to FIG. 3, the autonomous driving control apparatus may process a plurality of tasks using at least one module. For example, module 1 and module 2 shown in FIG. 3 may be an autonomous driving determination and control device 112 of FIG. 1, which is described above.

Referring to reference numeral 310, the autonomous driving control apparatus may sequentially process tasks 1 to 3 using module 1.

As an example, the autonomous driving control apparatus may process tasks 1 to 3 using module 1.

As an example, the autonomous driving control apparatus may maintain tasks 2 and 3 in a standby state, while processing task 1 using module 1. The autonomous driving control apparatus may control module 1 to proceed with processing of task 2 after the processing of task 1 is ended.

As an example, the autonomous driving control apparatus may identify tasks 1 to 3 which need to be processed, may control module 1 to process task 1, and may postpone processing of tasks 2 and 3 corresponding to a subordinate task.

At this time, as the processing of tasks 2 and 3 is delayed due to the processing of task 1, the autonomous driving determination operation is inefficiently performed. Thus, the autonomous driving control apparatus according to embodiments of the present disclosure may consider whether to additionally allocate a module like reference numeral 320.

Referring to reference numeral 320, the autonomous driving control apparatus may process tasks 1 to 3 in parallel using modules 1 and 2.

As an example, the autonomous driving control apparatus may process tasks 1 to 3 using modules 1 and 2.

As an example, while processing task 1 using module 1, the autonomous driving control apparatus may process task 2 using module 2 and may maintain task 3 in a standby state.

As an example, the autonomous driving control apparatus may identify tasks 1 to 3 which need to be processed, may control module 1 to process task 1, may additionally allocate module 2 to control module 2 to process task 2, and may postpone processing of subordinate task 3.

At this time, as module 1 and module 2 process task 1 and task 2, respectively, in parallel, the autonomous driving control apparatus may efficiently perform an autonomous driving determination operation. Furthermore, when there is no task which should be processed in parallel, the autonomous driving control apparatus may remove (or deactivate) module 2 to efficiently control a resource procedure.

Figure 4:
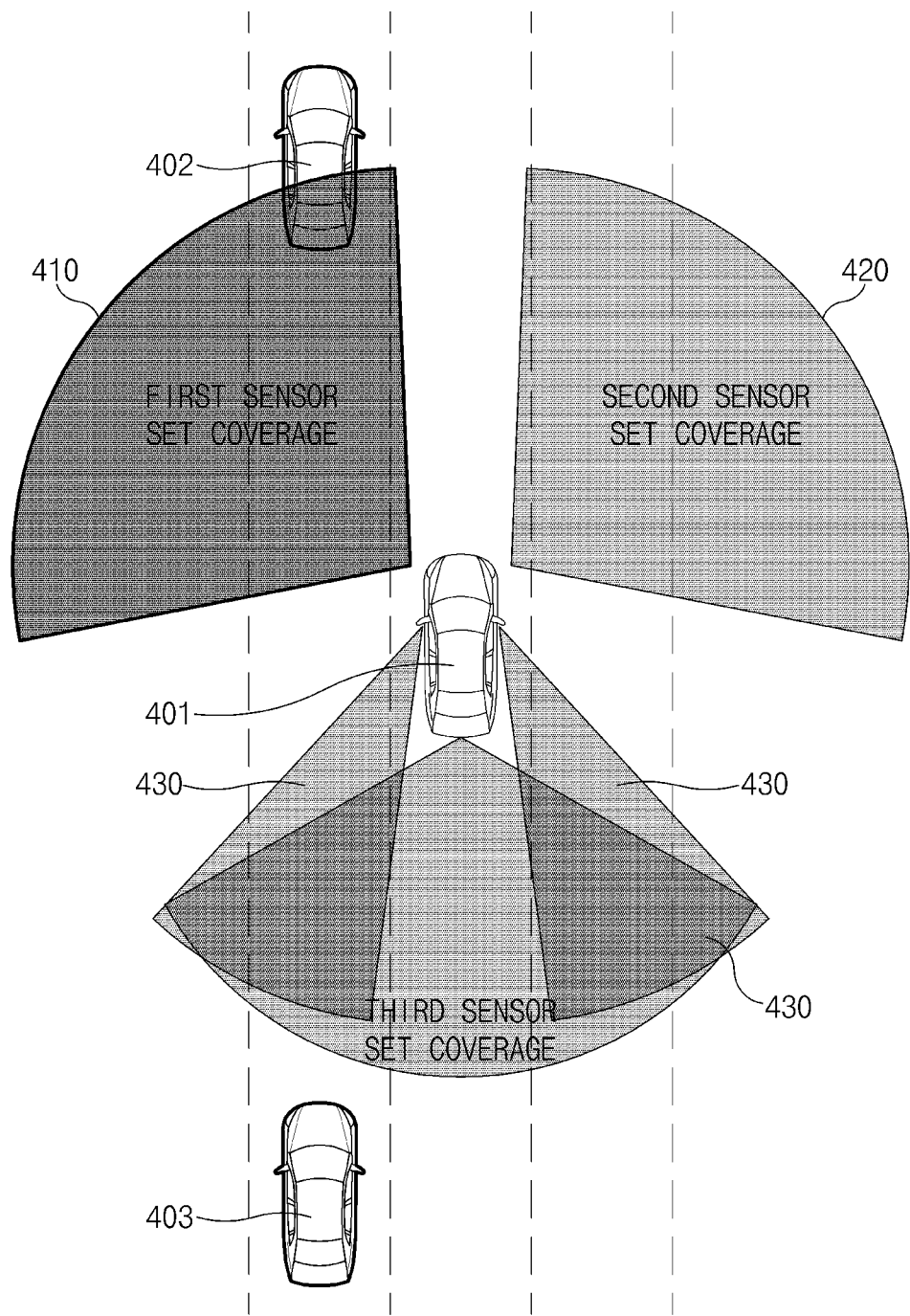
FIG. 4 is a drawing illustrating an operation where an autonomous driving control apparatus divides a plurality of sensors into at least one sensor set according to an embodiment of the present disclosure.

FIG. 4 is a drawing illustrating an operation where an autonomous driving control apparatus divides a plurality of sensors into at least one sensor set according to an embodiment of the present disclosure.

Referring to FIG. 4, the autonomous driving control apparatus may classify at least one sensor (e.g., a sensor device 101 of FIG. 1) included in an autonomous vehicle 401 into at least one sensor set.

As an example, the autonomous driving control apparatus may classify at least one sensor into at least one sensor set based on surrounding information and high definition map information, using a sensor set classification table. For example, the sensor set classification table may be referred to as a table generated based on sensor fusion domain information. The sensor fusion domain information may include information about whether there is redundancy of at least one sensor, a measurement period, a measurement distance, and/or classification information according to at least one driving situation of the autonomous vehicle 401.

As an example, the autonomous driving control apparatus may classify at least one sensor into at least one sensor set, based on information about whether there is redundancy of the at least one sensor. As an example, the autonomous driving control apparatus may determine whether there is redundancy of at least one sensor, using the information about whether there is the redundancy of the at least one sensor, and may classify sensors of a first group according to a determination that there is the redundancy into different sensor sets, respectively. For example, the autonomous driving control apparatus may classify a first sensor, a second sensor, and a third sensor included in the sensors of the first group into a first sensor set, a second sensor set, and a third sensor set, respectively. As shown in FIG. 4, sensing coverage of a plurality of sensor sets may correspond to first sensor set coverage 410, second sensor set coverage 420, and third sensor set coverage 430. For example, the first sensor set coverage 410 may be an area including a left side and a left front with respect to the direction in which the autonomous vehicle 401 looks. As an example, the first sensor set coverage 410 may be one sector area around the autonomous vehicle 401. For another example, the second sensor set coverage 420 may be an area including a right side and a right front with respect to the direction in which the autonomous vehicle 401 looks. As an example, the second sensor set coverage 420 may be one sector area around the autonomous vehicle 401. As another example, the third sensor set coverage 430 may be an area including the rear with respect to the direction in which the autonomous vehicle 401 looks. As an example, the third sensor set coverage 430 may be two or more sector areas around the autonomous vehicle 401.

As an example, the autonomous driving control apparatus may classify at least one sensor into at least one sensor set, based on information about a measurement period of the at least one sensor. As an example, the autonomous driving control apparatus may classify sensors of a second group identified as having a period of a specified value or less among the at least one sensor into different sensor sets, respectively. For example, the autonomous driving control apparatus may classify a fourth sensor, a fifth sensor, and a sixth sensor included in the sensors of the second group into a first sensor set, a second sensor set, and a third sensor set, respectively.

As an example, the autonomous driving control apparatus may classify at least one sensor into at least one sensor set, based on information about a driving situation of the autonomous vehicle 401. As an example, the autonomous driving control apparatus may divide a seventh sensor corresponding to a first situation among the at least one driving situation and an eighth sensor corresponding to a second situation different from the first situation and may classify the divided seventh sensor and the divided eighth sensor into different sensor sets, respectively.

For example, the first situation may be defined as a city situation. The city situation may be referred to as a driving situation on a road where there are more than a specified number of external objects in a distance adjacent to the autonomous vehicle 401 or a road on which a pedestrian may intrude. In this case, there is a need to perform a sensing operation at a short period for a relatively short distance. Thus, the autonomous driving control apparatus may perform a sensor set classification operation with regard to the driving situation.

For example, the second situation may be defined as a highway situation. The highway situation may be referred to as a driving situation in a situation where the outside of the autonomous vehicle 401 is relatively more static than the first situation. In this case, there is a need to perform a sensing operation at a long period for a relatively long distance. Thus, the autonomous driving control apparatus may perform a sensor set classification operation with regard to the driving situation.

As an example, the autonomous driving control apparatus may assign a different priority to each of the sensors in the classified sensor set.

For example, the autonomous driving control apparatus may identify a sensor which obtains information about a first other vehicle 402 and/or information about the direction of the first other vehicle 402 among sensors included in the first sensor set coverage 410 and may control the identified sensor to have a relatively high priority among the sensors in the first sensor set coverage 410.

For example, the autonomous driving control apparatus may identify a sensor which obtains information about a second other vehicle 403 and/or information about the direction of the second other vehicle 403 among sensors included in the third sensor set coverage 430 and may control the identified sensor to have a relatively high priority among the sensors in the third sensor set coverage 430.

The sensor set coverage area illustrated in FIG. 4 is illustrative, and embodiments of the present disclosure are not limited thereto. For example, the autonomous driving control apparatus may classify at least one sensor into four or more sensor sets. In this case, four or more pieces of sensor set coverage may be defined. For another example, some of the pieces of sensor set coverage may be overlapped with each other. As an example, unlike shown, at least a portion of the first sensor set coverage 410 may be overlapped with the second sensor set coverage 420.

FIG. 5 is a drawing illustrating a result where an autonomous driving control apparatus classifies sensor sets according to an embodiment of the present disclosure.

A table shown in FIG. 5 may be an example of a driving situation of an autonomous vehicle, which is used for sensor set classification by the autonomous driving control apparatus.

In an embodiment, the autonomous driving control apparatus may perform a sensing operation using sensors, measurement periods of which are 200 ms, 100 ms, and 50 ms, in a city situation.

As an example, the autonomous driving control apparatus may use a LiDAR, a measurement period of which is 200 ms, for mid- to long-range front measurement and/or mid-range front side measurement.

As an example, the autonomous driving control apparatus may use a radar, a measurement period of which is 200 ms, for long-range front measurement and/or long-range front side measurement.

As an example, the autonomous driving control apparatus may use a camera, a measurement period of which is 200 ms, for front measurement.

As an example, the autonomous driving control apparatus may use a LiDAR (e.g., a loop LiDAR), a measurement period of which is 100 ms, for omnidirectional measurement.

As an example, the autonomous driving control apparatus may use a radar, a measurement period of which is 100 ms, for mid-range front measurement and/or mid-range front side measurement.

As an example, the autonomous driving control apparatus may use a camera, a measurement period of which is 100 ms, for front measurement and/or front side measurement.

As an example, the autonomous driving control apparatus may use a radar, a measurement period of which is 50 ms, for mid-range front side measurement and/or mid-range rear side measurement.

As an example, the autonomous driving control apparatus may use a camera, a measurement period of which is 50 ms, for front side measurement, rear side measurement, and/or surround view monitoring (SVM) measurement.

In an embodiment, the autonomous driving control apparatus may perform a sensing operation using sensors, measurement periods of which are 300 ms, 200 ms, and 100 ms, in a highway situation.

As an example, the autonomous driving control apparatus may use a LiDAR, a measurement period of which is 300 ms, for long-range front measurement.

As an example, the autonomous driving control apparatus may use a radar, a measurement period of which is 300 ms, for long-range front measurement.

As an example, the autonomous driving control apparatus may use a camera, a measurement period of which is 300 ms, for stereo front measurement.

As an example, the autonomous driving control apparatus may use a LiDAR, a measurement period of which is 200 ms, for mid-range front measurement, mid- to long-range front side measurement and/or rear measurement.

As an example, the autonomous driving control apparatus may use a radar, a measurement period of which is 200 ms, for mid- to long-range front measurement and/or front side measurement.

As an example, the autonomous driving control apparatus may use a camera, a measurement period of which is 200 ms, for front measurement.

As an example, the autonomous driving control apparatus may use a LiDAR, a measurement period of which is 100 ms, for mid-range front side measurement and/or mid-range rear side measurement.

As an example, the autonomous driving control apparatus may use a radar, a measurement period of which is 100 ms, for front side measurement and/or rear side measurement.

As an example, the autonomous driving control apparatus may use a camera, a measurement period of which is 100 ms, for front side measurement.

Figure 6:
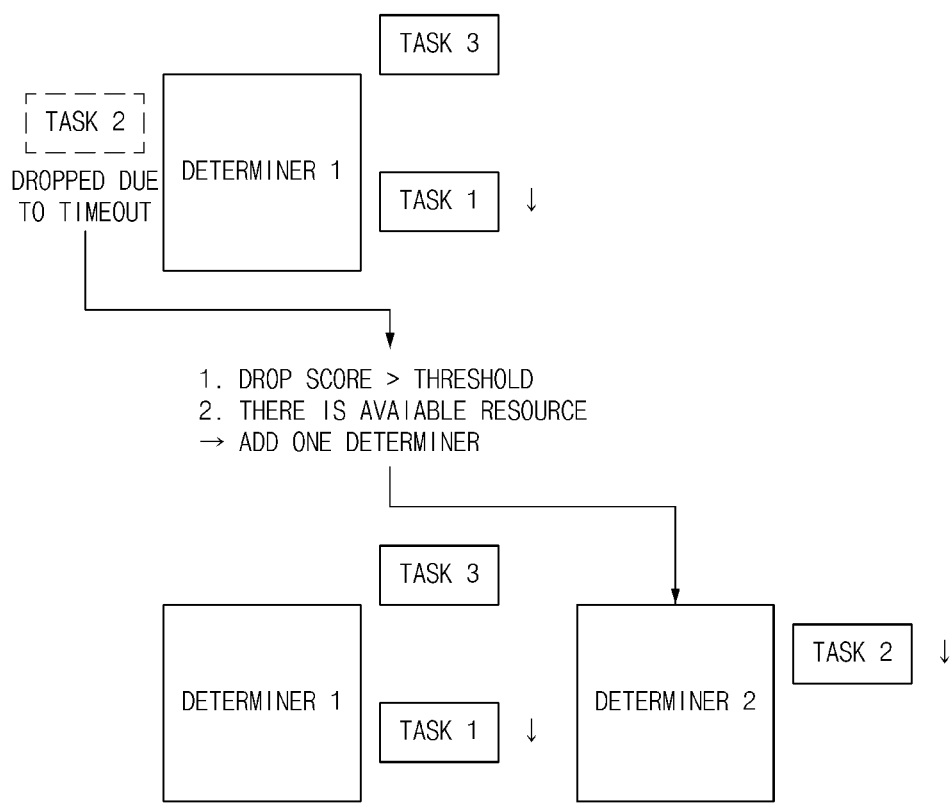
FIG. 6 is a drawing illustrating an operation where an autonomous driving control apparatus additionally allocates a determiner in parallel according to an embodiment of the present disclosure.

FIG. 6 is a drawing illustrating an operation where an autonomous driving control apparatus additionally allocates a determiner in parallel according to an embodiment of the present disclosure.

Referring to FIG. 6, the autonomous driving control apparatus may perform a task processing operation in parallel using a plurality of determiners.

As an example, the autonomous driving control apparatus may allocate tasks 1 to 3 to determiner 1. The autonomous driving control apparatus may process task 1 using determiner 1. In this case, task 2 may be omitted (or dropped) due to timeout.

In an embodiment, the autonomous driving control apparatus may determine whether a determiner input drop rate (or a drop score) is greater than a specified value. The specified value may be referred to as a predetermined threshold.

In an embodiment, the autonomous driving control apparatus may determine whether there is an available resource.

For example, when a computational resource utilization rate of the autonomous vehicle is less than or equal to a predetermined first threshold, the autonomous driving control apparatus may determine that there is the available resource.

For another example, when a resource occupancy rate of a storage of the autonomous vehicle is less than or equal to a predetermined second threshold, the autonomous driving control apparatus may determine that there is the available resource.

In an embodiment, the autonomous driving control apparatus may additionally allocate a determiner, based on whether a specified condition is met.

For example, when the determiner input drop rate is greater than the specified value, the autonomous driving control apparatus may additionally allocate determiner 2 in parallel.

For another example, the autonomous driving control apparatus may additionally allocate determiner 2 in parallel, based on determining that there is the available resource.

In an embodiment, while processing task 1 using module 1, the autonomous driving control apparatus may control determiners to process task 2 in parallel using determiner 2.

Figure 7:
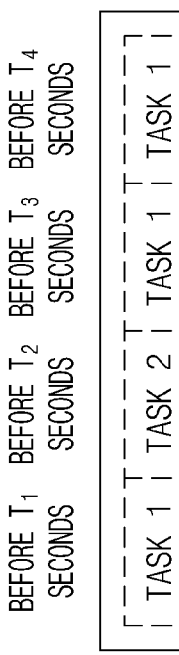
FIG. 7 is a drawing illustrating an operation where an autonomous driving control apparatus calculates a determiner input drop rate according to an embodiment of the present disclosure.

FIG. 7 is a drawing illustrating an operation where an autonomous driving control apparatus calculates a determiner input drop rate according to an embodiment of the present disclosure.

Referring to FIG. 7, the autonomous driving control apparatus may calculate a determiner input drop rate using various parameters.

In an embodiment, the autonomous driving control apparatus may identify a drop data buffer.

For example, when the entire length of the drop data buffer is N, the autonomous driving control apparatus may identify a buffer of task 1 before $T_1$ seconds, a buffer of task 2 before $T_2$ seconds, a buffer of task 1 before $T_3$ seconds, and/or a buffer of task 1 before $T_4$ seconds. In other words, the total length of the buffers of tasks 1 and 2 may be N.

In an embodiment, the autonomous driving control apparatus may determine a weight based on the fusion number of sensor sets or whether the sensor sets are fused with each other.

For example, the autonomous driving control apparatus may identify that three sensor sets are fused with respect to task 1. In this case, the autonomous driving control apparatus may determine a weight for task 1 as $w_1$. Because the number of tasks 1 included in the drop data buffer is three, the autonomous driving control apparatus may multiply a weight $w_1$ by three when calculating the determiner input drop rate.

For example, the autonomous driving control apparatus may identify that two sensor sets are fused with respect to task 2. In this case, the autonomous driving control apparatus may determine a weight for task 2 as $w_2$. Because the number of tasks 1 included in the drop data buffer is one, the autonomous driving control apparatus may multiply a weight $w_2$ by one when calculating the determiner input drop rate.

In an embodiment, the autonomous driving control apparatus may determine a weight based on a drop time point.

For example, the autonomous driving control apparatus may calculate and determine a weight associated with pieces of drop data for each of $T_1$ seconds, $T_3$ seconds, and $T_4$ seconds ago with respect to task 1. As an example, the autonomous driving control apparatus may determine a weight for drop data before $T_1$ seconds as $w_3/T_1$. As another example, the autonomous driving control apparatus may determine a weight for drop data before $T_3$ seconds as $w_3/T_3$. As another example, the autonomous driving control apparatus may determine a weight for drop data before $T_4$ seconds as $w_3/T_4$.

For example, the autonomous driving control apparatus may calculate and determine a weight associated with pieces of drop data for $T_2$ seconds ago with respect to task 2. As an example, the autonomous driving control apparatus may determine a weight for drop data before $T_2$ seconds as $w_3/T_2$.

In an embodiment, the autonomous driving control apparatus may calculate a determiner input drop rate using the total length of the drop data buffer, the weight determined based on whether sensor sets are fused, and the weight determined based on the drop time point.

For example, a formula where the autonomous driving control apparatus calculates the determiner input drop rate may be the same as Equation 1 below.

$$\frac{\left(3*W_1 + \frac{W_3}{T_1} + \frac{W_3}{T_3} + \frac{W_3}{T_4}\right) + \left(W_2 + \frac{W_3}{T_2}\right)}{N} \quad \text{Equation 1}$$

The above-mentioned method for calculating the determiner input drop rate is illustrative, and embodiments of the present disclosure are not limited thereto.

In an embodiment, the autonomous driving control apparatus may determine a weight associated with whether sensor sets are fused using the number of fusions among the sensor sets. For example, the autonomous driving control apparatus may determine a weight for a task processed by the fused sensor set to be greater than a weight for a task processed by a single sensor set. For another example, the autonomous driving control apparatus may determine a weight to be larger with respect to a task where more sensor sets are fused among tasks which are being processed. In this case, because the more the number of sensor sets, the higher the importance of a task processed by the sensor set, the autonomous driving control apparatus may determine a weight to be larger. For example, $w_1$ may be larger than $w_2$ in the above-mentioned example.

In an embodiment, the autonomous driving control apparatus may assign different weights to three or more tasks, respectively.

In an embodiment, the autonomous driving control apparatus may determine a weight for a task where the drop time point is closest to the present to be larger. In this case, because data dropped in the past relatively close to the present has higher association with current operation states of determiners, the autonomous driving control apparatus may determine a weight for a recently dropped task to be larger. For example, $w_3/T_4$ may be larger than $w_3/T_3$, $w_3/T_1$, and $w_3/T_2$ in the above-mentioned example.

Other than the above-mentioned examples, the autonomous driving control apparatus may calculate a determiner input drop rate by further using various parameters.

Figure 8:
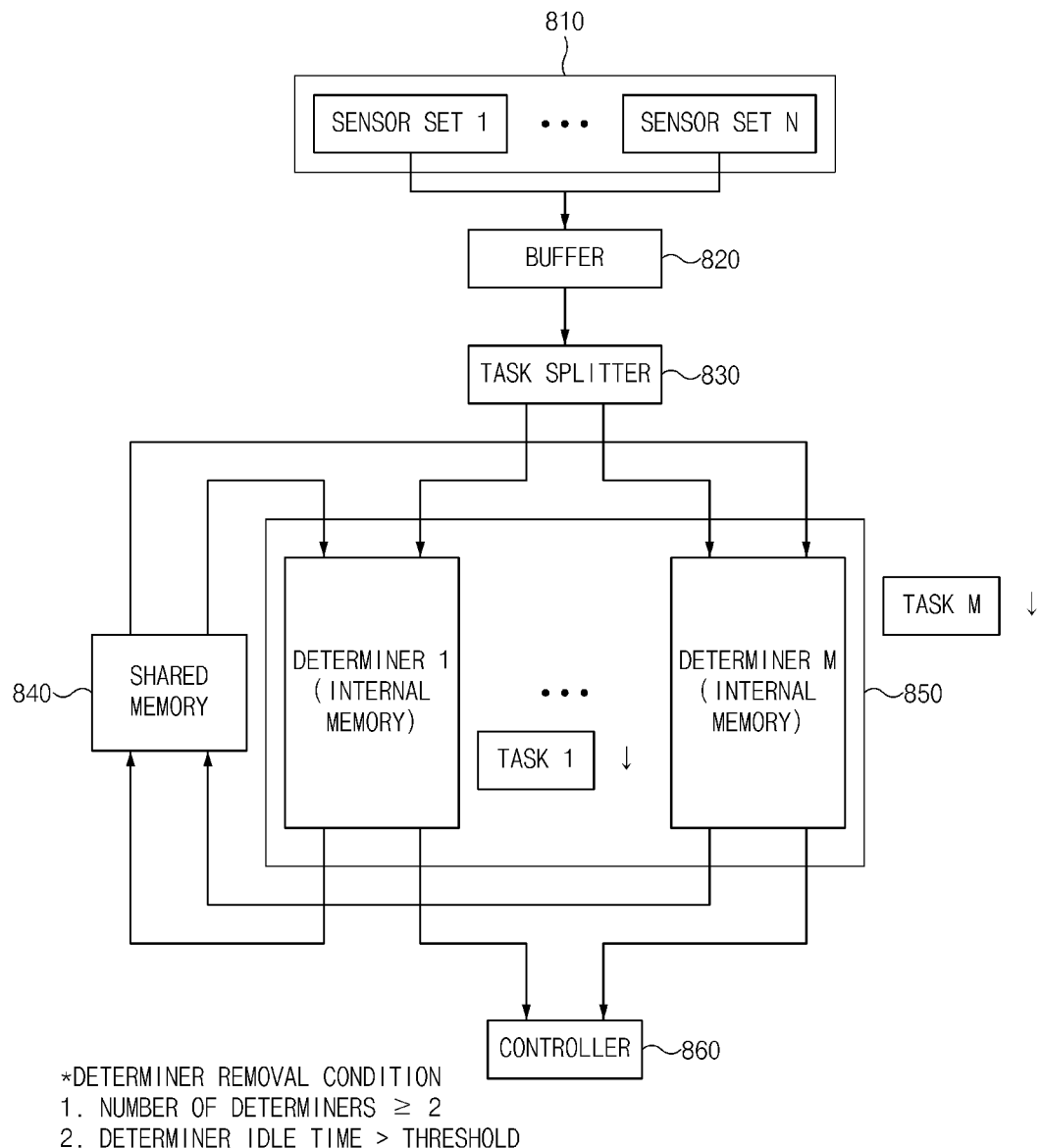
FIG. 8 is a drawing illustrating an operation where an autonomous driving control apparatus transmits and receives data with a shared memory according to an embodiment of the present disclosure.

FIG. 8 is a drawing illustrating an operation where an autonomous driving control apparatus transmits and receives data with a shared memory according to an embodiment of the present disclosure.

Referring to FIG. 8, the autonomous driving control apparatus may perform an autonomous driving determination operation using N sensor sets 810, a buffer 820, a task splitter 830, and M determiners 850. For example, the autonomous driving control apparatus may perform an autonomous driving determination operation by further using data transmitted and received with a shared memory 840 outside an autonomous vehicle.

In an embodiment, the autonomous driving control apparatus may perform a sensing operation using sensor sets 1 to N included in the N sensor sets 810 to obtain data.

In an embodiment, the autonomous driving control apparatus may store the obtained data in the buffer 820.

For example, the sensing data may be referred to as data which has a fixed length and includes a time stamp.

In an embodiment, the autonomous driving control apparatus may transmit at least a portion of the data stored in the buffer 820 to the task splitter 830.

For example, the autonomous driving control apparatus may remove data older than a specified time based on the time stamp among the pieces of data stored in the buffer 820. The autonomous driving control apparatus may transmit at least some of the remaining pieces of data except for the removed pieces of data to the task splitter 830.

In an embodiment, the autonomous driving control apparatus may allocate pieces of data to the M determiners 850, using the task splitter 830.

For example, the autonomous driving control apparatus may identify information (e.g., operation or not) about each of the M determiners 850. The autonomous driving control apparatus may allocate tasks to determiners using the task splitter 830, based on the identified information.

In an embodiment, the autonomous driving control apparatus may process tasks using determiners 1 to M. The M determiners 850 may be referred to as a software module stored in an internal memory (or storage) of the autonomous vehicle.

For example, while processing task 1 using determiner 1, the autonomous driving control apparatus may process task M in parallel using determiner M.

In an embodiment, the autonomous driving control apparatus may transmit output data processed by the M determiners 850 a controller 860.

For example, the autonomous driving control apparatus may transmit first output data output by processing task 1 using determiner 1 to the controller 860.

For example, the autonomous driving control apparatus may transmit second output data output by processing task 2 using determiner 2 to the controller 860.

In an embodiment, the autonomous driving control apparatus may transmit output data processed by the M determiners 850 to the shared memory 840. The shared memory 840 may be an external device of the autonomous vehicle.

For example, the autonomous driving control apparatus may transmit the first output data and the second output data which are output by respectively processing task 1 and task 2 using determiner 1 and determiner 2 to the shared memory 840.

In an embodiment, the autonomous driving control apparatus may further process data transmitted from the external device by means of the determiner.

For example, the autonomous driving control apparatus may process the second output data by means of determiner 1, based on receiving the second output data transmitted to the external device again. As an example, a first determination period which is a determination period of determiner 1 may be greater than a second determination period which is a determination period of determiner 2.

In an embodiment, the autonomous driving control apparatus may remove at least some of the M determiners 850 based on whether a specified condition is met.

For example, when the number of determiners is greater than or equal to two and when a determiner idle time is greater than a threshold, the autonomous driving control apparatus may remove at least some of the determiners.

FIGS. 9 to 13 are drawings illustrating an operation where an autonomous driving control apparatus performs an autonomous driving determination operation using at least one sensor set and at least one determiner according to an embodiment of the present disclosure.

Figure 9:
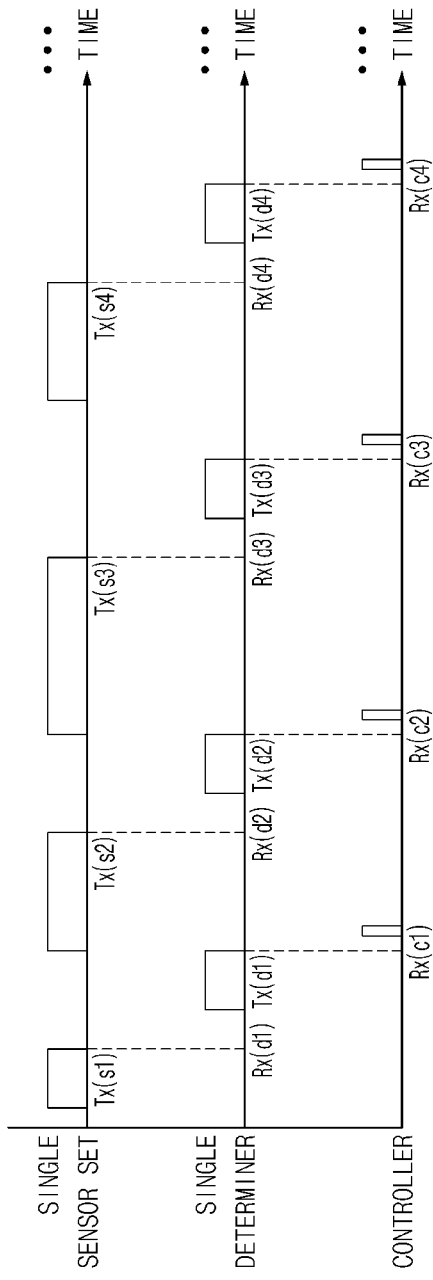
FIGS. 9, 10, 11, 12, and 13 are drawings illustrating an operation where an autonomous driving control apparatus performs an autonomous driving determination operation using at least one sensor set and at least one determiner according to an embodiment of the present disclosure.

FIG. 9 illustrates data transmission and reception flow over time of an autonomous driving control apparatus which performs an autonomous driving determination and control operation using a single sensor set and a single determiner. A delay between data transmission and reception times between components may be less than 3 ms. Thus, the delay may be omitted in the illustrated drawing.

Referring to FIG. 9, the autonomous driving control apparatus may transmit data obtained using a single sensor set to a single determiner and may transmit data output using data received in the single determiner to a controller.

As an example, the autonomous driving control apparatus may transmit data obtained using the single sensor set to the single determiner at Tx(s1). The single determiner may receive data transmitted at Tx(s1) from the single sensor set at Rx(d1), may perform a determination operation using the received data, and may transmit output data generated as a result of the determination to a controller at Tx(d1). The controller may receive output data transmitted at Tx(d1)

from the single determiner at Rx(c1). The controller may perform a control operation for the autonomous vehicle using the received data.

As an example, the autonomous driving control apparatus may transmit data obtained using the single sensor set to the single determiner at Tx(s2). The single determiner may receive data transmitted at Tx(s2) from the single sensor set at Rx(d2), may perform a determination operation using the received data, and may transmit output data generated as a result of the determination to the controller at Tx(d2). The controller may receive output data transmitted at Tx(d2) from the single determiner at Rx(c2). The controller may perform a control operation for the autonomous vehicle using the received data.

As an example, the autonomous driving control apparatus may transmit data obtained using the single sensor set to the single determiner at Tx(s3). The single determiner may receive data transmitted at Tx(s3) from the single sensor set at Rx(d3), may perform a determination operation using the received data, and may transmit output data generated as a result of the determination to the controller at Tx(d3). The controller may receive output data transmitted at Tx(d3) from the single determiner at Rx(c3). The controller may perform a control operation for the autonomous vehicle using the received data.

As an example, the autonomous driving control apparatus may transmit data obtained using the single sensor set to the single determiner at Tx(s4). The single determiner may receive data transmitted at Tx(s4) from the single sensor set at Rx(d4), may perform a determination operation using the received data, and may transmit output data generated as a result of the determination to the controller at Tx(d4). The controller may receive output data transmitted at Tx(d4) from the single determiner at Rx(c4). The controller may perform a control operation for the autonomous vehicle using the received data.

Hereinafter, in a description of FIG. 10, a description will be given below of an example of the autonomous driving control apparatus which performs a control operation for the autonomous vehicle using a plurality of sensor sets and a plurality of determiners.

Figure 10:
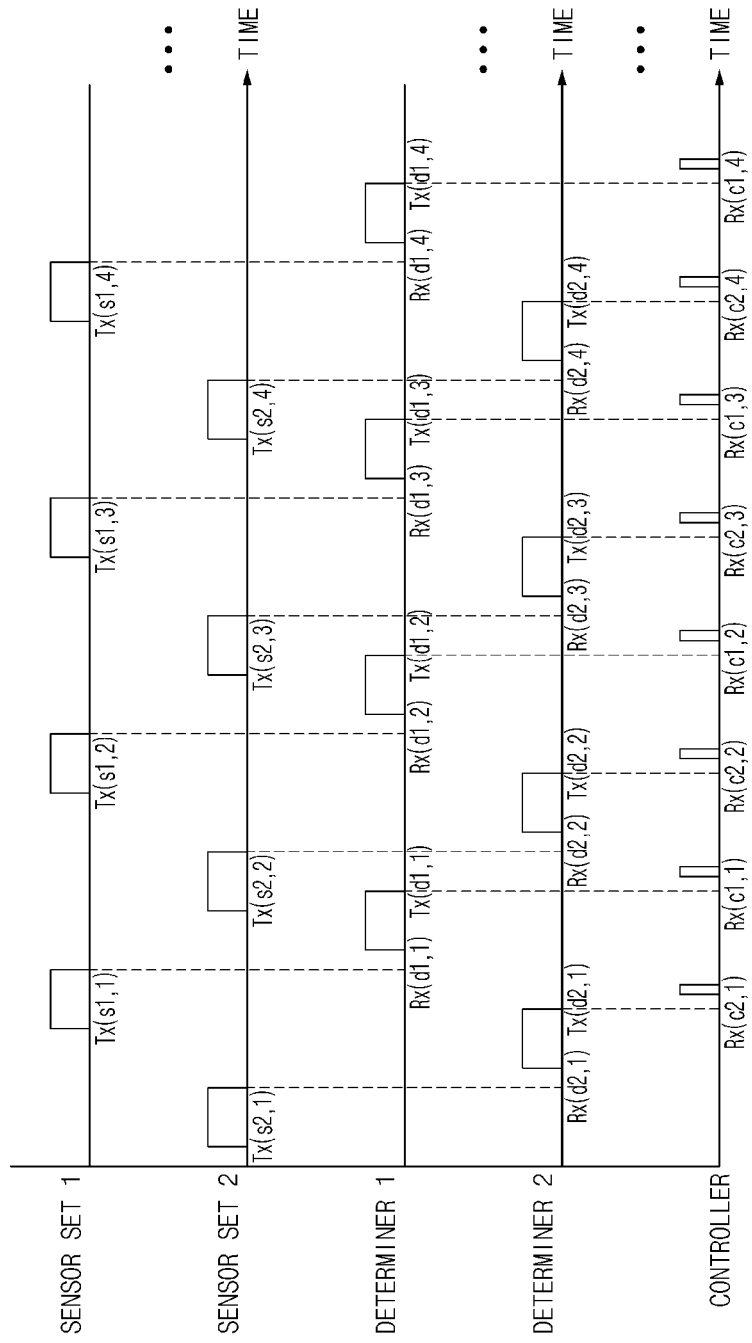

FIG. 10 illustrates data transmission and reception flow over time of an autonomous driving control apparatus which performs an autonomous driving determination and control operation using sensor set 1, sensor set 2, determiner 1, determiner 2, and a controller. A delay between data transmission and reception times between components may be less than 3 ms. Thus, the delay may be omitted in the illustrated drawing.

As an example, the autonomous driving control apparatus may transmit data obtained using sensor set 1 to determiner 1 at Tx(s1,1). Determiner 1 may receive data transmitted at Tx(s1,1) from sensor set 1 at Rx(d1,1), may perform a determination operation using the received data, and may transmit output data generated as a result of the determination to a controller at Tx(d1,1). The controller may receive output data transmitted at Tx(d1,1) from determiner 1 at Rx(c1,1). The controller may perform a control operation for the autonomous vehicle using the received data.

As an example, the autonomous driving control apparatus may transmit data obtained using sensor set 1 to determiner 1 at Tx(s1,2). Determiner 1 may receive data transmitted at Tx(s1,2) from sensor set 1 at Rx(d1,2), may perform a determination operation using the received data, and may transmit output data generated as a result of the determination to the controller at Tx(d1,2). The controller may receive output data transmitted at Tx(d1,2) from determiner 1 at Rx(c1,2). The controller may perform a control operation for the autonomous vehicle using the received data.

As an example, the autonomous driving control apparatus may transmit data obtained using sensor set 1 to determiner 1 at Tx(s1,3). Determiner 1 may receive data transmitted at Tx(s1,3) from sensor set 1 at Rx(d1,3), may perform a determination operation using the received data, and may transmit output data generated as a result of the determination to the controller at Tx(d1,3). The controller may receive output data transmitted at Tx(d1,3) from determiner 1 at Rx(c1,3). The controller may perform a control operation for the autonomous vehicle using the received data.

As an example, the autonomous driving control apparatus may transmit data obtained using sensor set 1 to determiner 1 at Tx(s1,4). Determiner 1 may receive data transmitted at Tx(s1,4) from sensor set 1 at Rx(d1,4), may perform a determination operation using the received data, and may transmit output data generated as a result of the determination to the controller at Tx(d1,4). The controller may receive output data transmitted at Tx(d1,4) from determiner 1 at Rx(c1,4). The controller may perform a control operation for the autonomous vehicle using the received data.

As an example, the autonomous driving control apparatus may transmit data obtained using sensor set 2 to determiner 2 at Tx(s2,1). Determiner 2 may receive data transmitted at Tx(s2,1) from sensor set 2 at Rx(d2,1), may perform a determination operation using the received data, and may transmit output data generated as a result of the determination to the controller at Tx(d2,1). The controller may receive output data transmitted at Tx(d2,1) from determiner 2 at Rx(c2,1). The controller may perform a control operation for the autonomous vehicle using the received data.

As an example, the autonomous driving control apparatus may transmit data obtained using sensor set 2 to determiner 2 at Tx(s2,2). Determiner 2 may receive data transmitted at Tx(s2,2) from sensor set 2 at Rx(d2,2), may perform a determination operation using the received data, and may transmit output data generated as a result of the determination to the controller at Tx(d2,2). The controller may receive output data transmitted at Tx(d2,2) from determiner 2 at Rx(c2,2). The controller may perform a control operation for the autonomous vehicle using the received data.

As an example, the autonomous driving control apparatus may transmit data obtained using sensor set 2 to determiner 2 at Tx(s2,3). Determiner 2 may receive data transmitted at Tx(s2,3) from sensor set 2 at Rx(d2,3), may perform a determination operation using the received data, and may transmit output data generated as a result of the determination to the controller at Tx(d2,3). The controller may receive output data transmitted at Tx(d2,3) from determiner 2 at Rx(c2,3). The controller may perform a control operation for the autonomous vehicle using the received data.

As an example, the autonomous driving control apparatus may transmit data obtained using sensor set 2 to determiner 2 at Tx(s2,4). Determiner 2 may receive data transmitted at Tx(s2,4) from sensor set 2 at Rx(d2,4), may perform a determination operation using the received data, and may transmit output data generated as a result of the determination to the controller at Tx(d2,4). The controller may receive output data transmitted at Tx(d2,4) from determiner 2 at Rx(c2,4). The controller may perform a control operation for the autonomous vehicle using the received data.

As shown in the above-mentioned example of FIG. 10 as compared with FIG. 9, the autonomous driving control apparatus may process the process in parallel by further using the determiner additionally allocated based on the plurality of sensor sets classified based on the specified criterion and whether the specified condition is met, thus performing an efficient autonomous driving control operation.

Figure 11:
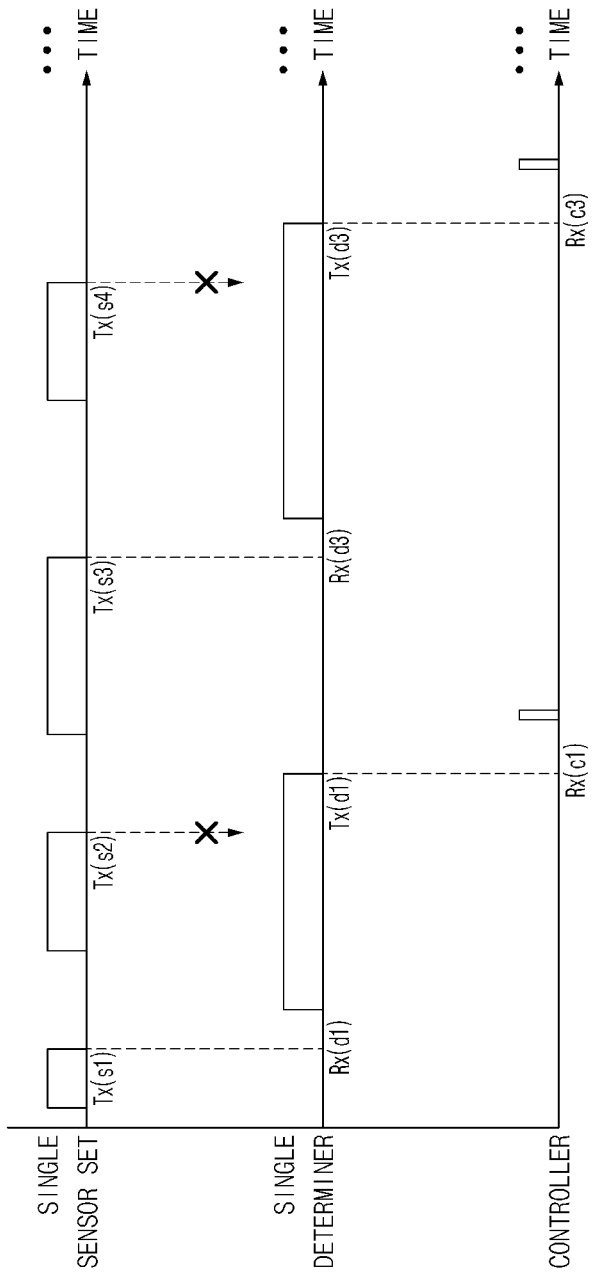

FIG. 11 illustrates data transmission and reception flow over time of an autonomous driving control apparatus which performs an autonomous driving determination and control operation using a single sensor set and a single determiner. A delay between data transmission and reception times between components may be less than 3 ms. Thus, the delay may be omitted in the illustrated drawing.

Referring to FIG. 11, in an embodiment, the autonomous driving control apparatus may drop processing of data obtained by means of a sensor set while the single determiner operates. This may be defined as determiner input drop.

As an example, the autonomous driving control apparatus may transmit data obtained using the single sensor set to the single determiner at Tx(s1). The single determiner may receive data transmitted at Tx(s1) from the single sensor set at Rx(d1), may perform a determination operation using the received data, and may transmit output data generated as a result of the determination to a controller at Tx(d1). The controller may receive output data transmitted at Tx(d1) from the single determiner at Rx(c1). The controller may perform a control operation for the autonomous vehicle using the received data.

As an example, an input drop phenomenon may occur in a process where the autonomous driving control apparatus transmits data obtained using the single sensor set to the single determiner at Tx(s2). In other words, there may occur a problem of determiner input drop where data transmitted from the sensor set to the determiner at Tx(s2) is not input because an operation of the determiner is performed.

As another example, the autonomous driving control apparatus may transmit data obtained using the single sensor set to the single determiner at Tx(s3). The single determiner may receive data transmitted at Tx(s3) from the single sensor set at Rx(d3), may perform a determination operation using the received data, and may transmit output data generated as a result of the determination to the controller at Tx(d3). The controller may receive output data transmitted at Tx(d3) from the single determiner at Rx(c3). The controller may perform a control operation for the autonomous vehicle using the received data.

In this case, the input drop phenomenon may occur in a process where the autonomous driving control apparatus transmits data obtained using the single sensor set to the single determiner at Tx(s4). In other words, there may occur a problem of determiner input drop where data transmitted from the sensor set to the determiner at Tx(s4) is not input because an operation of the determiner is performed.

Hereinafter, in a description of FIG. 12, to prevent the above-mentioned determiner input drop problem of FIG. 11, a description will be given of an embodiment where the autonomous driving control apparatus allocates an additional determiner in parallel.

Figure 12:
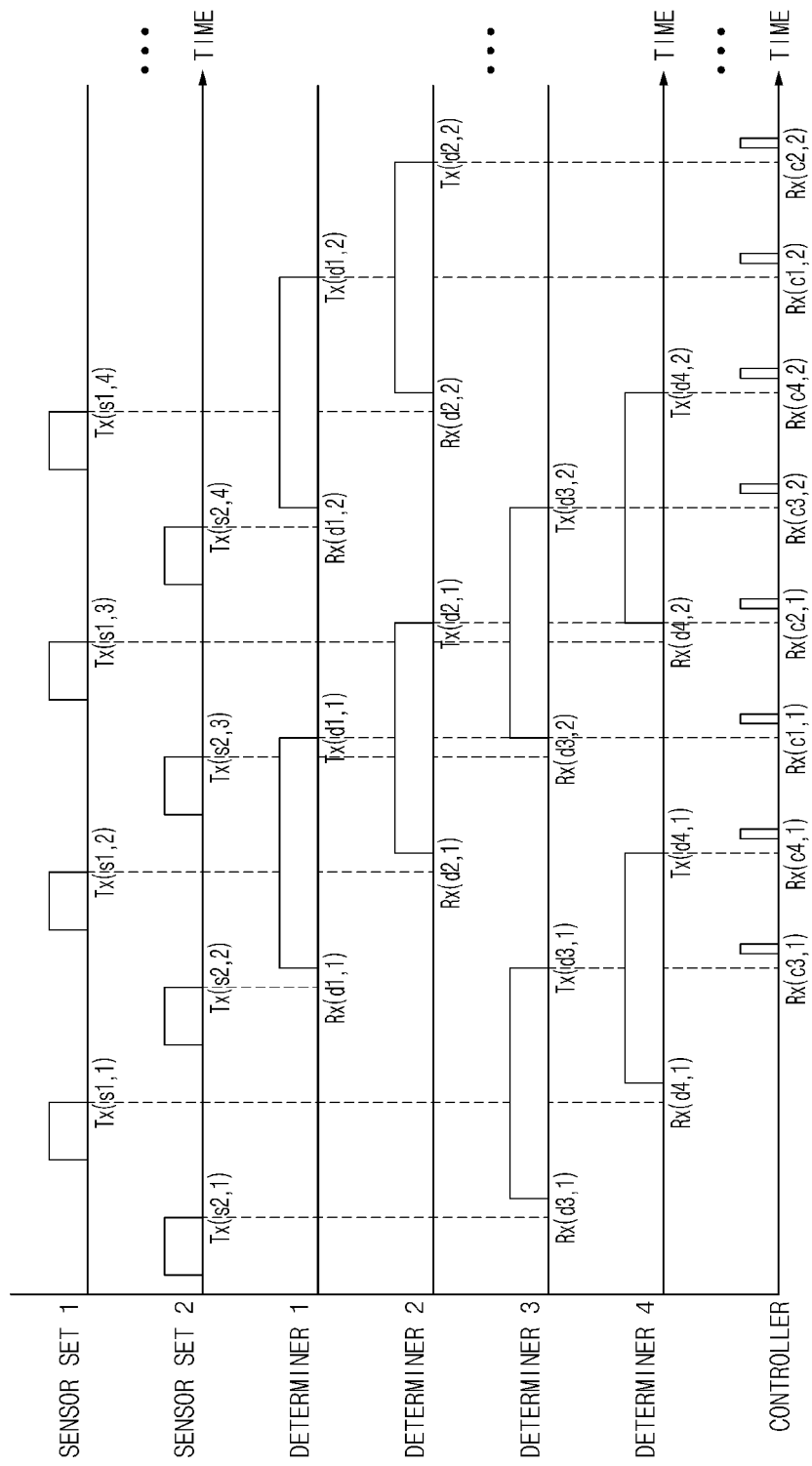

FIG. 12 illustrates data transmission and reception flow over time of an autonomous driving control apparatus which performs an autonomous driving determination and control operation using sensor set 1, sensor set 2, determiner 1, determiner 2, determiner 3, determiner 4, and a controller. A delay between data transmission and reception times between components may be less than 3 ms. Thus, the delay may be omitted in the illustrated drawing.

As an example, the autonomous driving control apparatus may transmit data obtained using sensor set 1 to determiner 4 at Tx(s1,1). Determiner 4 may receive data transmitted at Tx(s1,1) from sensor set 1 at Rx(d4,1), may perform a determination operation using the received data, and may transmit output data generated as a result of the determination to the controller at Tx(d4,1). The controller may receive output data transmitted at Tx(d4,1) from determiner 4 at Rx(c4,1). The controller may perform a control operation for the autonomous vehicle using the received data.

As an example, the autonomous driving control apparatus may transmit data obtained using sensor set 1 to determiner 2 at Tx(s1,2). Determiner 2 may receive data transmitted at Tx(s1,2) from sensor set 1 at Rx(d2,1), may perform a determination operation using the received data, and may transmit output data generated as a result of the determination to the controller at Tx(d2,1). The controller may receive output data transmitted at Tx(d2,1) from determiner 2 at Rx(c2,1). The controller may perform a control operation for the autonomous vehicle using the received data.

As an example, the autonomous driving control apparatus may transmit data obtained using sensor set 1 to determiner 4 at Tx(s1,3). Determiner 4 may receive data transmitted at Tx(s1,3) from sensor set 1 at Rx(d4,2), may perform a determination operation using the received data, and may transmit output data generated as a result of the determination to the controller at Tx(d4,2). The controller may receive output data transmitted at Tx(d4,2) from determiner 4 at Rx(c4,2). The controller may perform a control operation for the autonomous vehicle using the received data.

As an example, the autonomous driving control apparatus may transmit data obtained using sensor set 1 to determiner 2 at Tx(s1,4). Determiner 2 may receive data transmitted at Tx(s1,4) from sensor set 1 at Rx(d2,2), may perform a determination operation using the received data, and may transmit output data generated as a result of the determination to the controller at Tx(d2,2). The controller may receive output data transmitted at Tx(d2,2) from determiner 2 at Rx(c2,2). The controller may perform a control operation for the autonomous vehicle using the received data.

As an example, the autonomous driving control apparatus may transmit data obtained using sensor set 2 to determiner 3 at Tx(s2,1). Determiner 3 may receive data transmitted at Tx(s2,1) from sensor set 2 at Rx(d3,1), may perform a determination operation using the received data, and may transmit output data generated as a result of the determination to the controller at Tx(d3,1). The controller may receive output data transmitted at Tx(d3,1) from determiner 3 at Rx(c3,1). The controller may perform a control operation for the autonomous vehicle using the received data.

As an example, the autonomous driving control apparatus may transmit data obtained using sensor set 2 to determiner 1 at Tx(s2,2). Determiner 1 may receive data transmitted at Tx(s2,2) from sensor set 2 at Rx(d1,1), may perform a determination operation using the received data, and may transmit output data generated as a result of the determination to the controller at Tx(d1,1). The controller may receive output data transmitted at Tx(d1,1) from determiner 1 at Rx(c1,1). The controller may perform a control operation for the autonomous vehicle using the received data.

As an example, the autonomous driving control apparatus may transmit data obtained using sensor set 2 to determiner 3 at Tx(s2,3). Determiner 3 may receive data transmitted at Tx(s2,3) from sensor set 2 at Rx(d3,2), may perform a determination operation using the received data, and may transmit output data generated as a result of the determination to the controller at Tx(d3,2). The controller may receive output data transmitted at Tx(d3,2) from determiner 3 at Rx(c3,2). The controller may perform a control operation for the autonomous vehicle using the received data.

As an example, the autonomous driving control apparatus may transmit data obtained using sensor set 2 to determiner 1 at Tx(s2,4). Determiner 1 may receive data transmitted at Tx(s2,4) from sensor set 2 at Rx(d1,2), may perform a determination operation using the received data, and may transmit output data generated as a result of the determination to the controller at Tx(d1,2). The controller may receive output data transmitted at Tx(d1,2) from determiner 1 at Rx(c1,2). The controller may perform a control operation for the autonomous vehicle using the received data.

As shown in the above-mentioned example of FIG. 12 as compared with FIG. 11, the autonomous driving control apparatus may process the process in parallel by further using the determiner additionally allocated based on the plurality of sensor sets classified based on the specified criterion and whether the specified condition is met, thus performing an efficient autonomous driving control operation.

Figure 13:
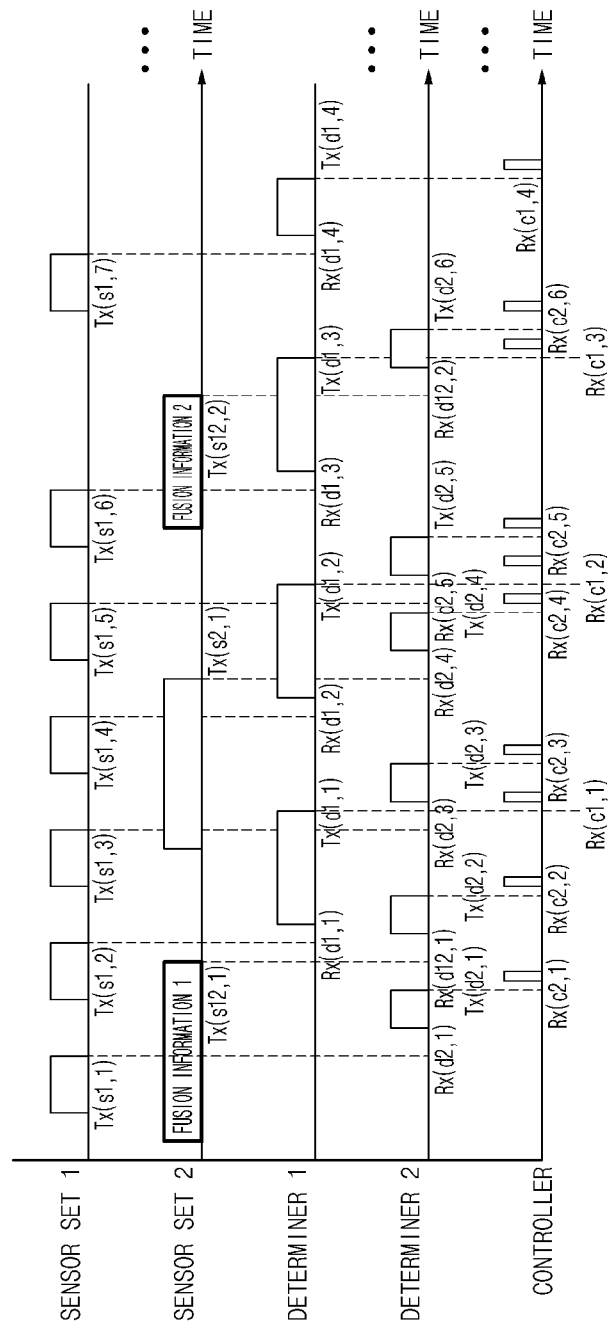

FIG. 13 illustrates data transmission and reception flow over time of an autonomous driving control apparatus which performs an autonomous driving determination and control operation using sensor set 1, sensor set 2, determiner 1, determiner 2, and a controller. A delay between data transmission and reception times between components may be less than 3 ms. Thus, the delay may be omitted in the illustrated drawing.

Referring to FIG. 13, the autonomous driving control apparatus may process one piece of fusion information obtained by fusing pieces of data obtained by sensor sets by means of at least one determiner. For example, the autonomous driving control apparatus may transmit fusion information 1 obtained by fusing at least a portion of data obtained using sensor set 1 at Tx(s1,1) with at least a portion of data obtained using sensor set 2 to determiner 2 at Tx(s12,1). For another example, the autonomous driving control apparatus may transmit fusion information 2 obtained by fusing at least a portion of data obtained using sensor set 1 at Tx(s1,6) with at least a portion of data obtained using sensor set 2 to determiner 2 at Tx(s12,2). The autonomous driving control apparatus may fuse only the other data except for data obtained before a specified time among data obtained using sensor set 1 with data obtained using sensor set 2. For example, the autonomous driving control apparatus may fuse only data obtained using sensor set 1 before a specified time from a time point when sensor set 2 performs data fusion. The autonomous driving control apparatus may not fuse data obtained using sensor set 1 after sensor set 2 starts data fusion. As a result, the autonomous driving control apparatus may use relatively recently obtained data as fusion information and may exclude data additionally obtained in the fusion process from a fusion target, thus performing a more efficient and accurate autonomous driving determination operation. As described above, the autonomous driving determination operation performed using the fusion information by the autonomous driving control apparatus may be conceptually illustrated in FIG. 14.

In this case, the autonomous driving control apparatus may increase accuracy of determination when transmitting fusion information obtained by fusing pieces of data obtained by a plurality of sensor sets based on a specified criterion to the determiner and performing an autonomous driving determination operation more than when transmitting only at least a portion of data obtained using sensor set 1 to the determiner and performing the autonomous driving determination operation.

As an example, the autonomous driving control apparatus may generate fusion information based on whether it is possible to fuse some of pieces of data obtained using the plurality of sensor sets. For example, the autonomous driving control apparatus may determine whether to generate fusion information based on whether a difference between time stamps of pieces of data which are fusion targets is greater than a specified value and/or whether some of the pieces of data which are the fusion targets are previously processed data.

As an example, the autonomous driving control apparatus may transmit data obtained using sensor set 1 to determiner 2 at Tx(s1,1). Determiner 2 may receive data transmitted at Tx(s1,1) from sensor set 1 at Rx(d2,1), may perform a determination operation using the received data, and may transmit output data generated as a result of the determination to the controller at Tx(d2,1). The controller may receive output data transmitted at Tx(d2,1) from determiner 2 at Rx(c2,1). The controller may perform a control operation for the autonomous vehicle using the received data.

As an example, the autonomous driving control apparatus may transmit data obtained using sensor set 1 to determiner 1 at Tx(s1,2). Determiner 1 may receive data transmitted at Tx(s1,2) from sensor set 1 at Rx(d1,1), may perform a determination operation using the received data, and may transmit output data generated as a result of the determination to the controller at Tx(d1,1). The controller may receive output data transmitted at Tx(d1,1) from determiner 1 at Rx(c1,1). The controller may perform a control operation for the autonomous vehicle using the received data.

As an example, the autonomous driving control apparatus may transmit data obtained using sensor set 1 to determiner 2 at Tx(s1,3). Determiner 2 may receive data transmitted at Tx(s1,3) from sensor set 1 at Rx(d2,3), may perform a determination operation using the received data, and may transmit output data generated as a result of the determination to the controller at Tx(d2,3). The controller may receive output data transmitted at Tx(d2,3) from determiner 2 at Rx(c2,3). The controller may perform a control operation for the autonomous vehicle using the received data.

As an example, the autonomous driving control apparatus may transmit data obtained using sensor set 1 to determiner 1 at Tx(s1,4). Determiner 1 may receive data transmitted at Tx(s1,4) from sensor set 1 at Rx(d1,2), may perform a determination operation using the received data, and may transmit output data generated as a result of the determination to the controller at Tx(d1,2). The controller may receive output data transmitted at Tx(d1,2) from determiner 1 at Rx(c1,2). The controller may perform a control operation for the autonomous vehicle using the received data.

As an example, the autonomous driving control apparatus may transmit data obtained using sensor set 1 to determiner 2 at Tx(s1,5). Determiner 2 may receive data transmitted at Tx(s1,5) from sensor set 1 at Rx(d2,5), may perform a determination operation using the received data, and may transmit output data generated as a result of the determination to the controller at Tx(d2,5). The controller may receive output data transmitted at Tx(d2,5) from determiner 2 at Rx(c2,5). The controller may perform a control operation for the autonomous vehicle using the received data.

As an example, the autonomous driving control apparatus may transmit data obtained using sensor set 1 to determiner 1 at Tx(s1,6). Determiner 1 may receive data transmitted at Tx(s1,6) from sensor set 1 at Rx(d1,3), may perform a determination operation using the received data, and may transmit output data generated as a result of the determination to the controller at Tx(d1,3). The controller may receive output data transmitted at Tx(d1,3) from determiner 1 at Rx(c1,3). The controller may perform a control operation for the autonomous vehicle using the received data.

As an example, the autonomous driving control apparatus may transmit data obtained using sensor set 1 to determiner 1 at Tx(s1,7). Determiner 1 may receive data transmitted at Tx(s1,7) from sensor set 1 at Rx(d1,4), may perform a determination operation using the received data, and may transmit output data generated as a result of the determination to the controller at Tx(d1,4). The controller may receive output data transmitted at Tx(d1,4) from determiner 1 at Rx(c1,4). The controller may perform a control operation for the autonomous vehicle using the received data.

As an example, the autonomous driving control apparatus may transmit fusion information 1 obtained by fusing pieces of data obtained using sensor set 1 and sensor set 2 to determiner 2 at Tx(s12,1). Fusion information 1 may be defined as data where at least a portion of data obtained by means of sensor set 1 and at least a portion of data obtained by means of sensor set 2 are fused with each other. The autonomous driving control apparatus may determine whether the pieces of data meet a specified condition (e.g., whether a difference between time stamps of pieces of data which are fusion targets is greater than a specified value and/or whether some of the pieces of data which are the fusion targets are previously processed data) and may control sensor set 2 to generate and transmit fusion information 1 to determiner 2 when the pieces of data meet the specified condition. Determiner 2 may receive data transmitted at Tx(s12,1) from sensor set 2 at Rx(d12,1), may perform a determination operation using the received data, and may transmit output data generated as a result of the determination to the controller at Tx(d,2,2). The controller may receive output data transmitted at Tx(d,2,2) from determiner 2 at Rx(c2,2). The controller may perform a control operation for the autonomous vehicle using the received data.

As an example, the autonomous driving control apparatus may transmit data obtained using sensor set 2 to determiner 2 at Tx(s2,1). Determiner 2 may receive data transmitted at Tx(s2,1) from sensor set 2 at Rx(d2,4), may perform a determination operation using the received data, and may transmit output data generated as a result of the determination to the controller at Tx(d2,4). The controller may receive output data transmitted at Tx(d2,4) from determiner 2 at Rx(c2,4). The controller may perform a control operation for the autonomous vehicle using the received data.

As an example, the autonomous driving control apparatus may transmit fusion information 2 obtained by fusing pieces of data obtained using sensor set 1 and sensor set 2 to 4 determiner 2 at Tx(s12,2). Fusion information 2 may be defined as data where at least a portion of data obtained by means of sensor set 1 and at least a portion of data obtained by means of sensor set 2 are fused with each other. The autonomous driving control apparatus may determine whether the pieces of data meet the specified condition (e.g., whether the difference between the time stamps of the pieces of data which are the fusion targets is greater than the specified value and/or whether some of the pieces of data which are the fusion targets are the previously processed data) and may control sensor set 2 to generate and transmit fusion information 2 to determiner 2 when the pieces of data meet the specified condition. Determiner 2 may receive data transmitted at Tx(s12,2) from sensor set 2 at Rx(d12,2), may perform a determination operation using the received data, and may transmit output data generated as a result of the determination to the controller at Tx(d2,6). The controller may receive output data transmitted at Tx(d2,6) from determiner 2 at Rx(c2,6). The controller may perform a control operation for the autonomous vehicle using the received data.

FIG. 13 illustrates that the fusion information is transmitted to the determiner through sensor set 2, but embodiments of the present disclosure are not limited thereto. For example, an embodiment where at least a portion of data obtained using sensor set 2 and at least a portion of data obtained using sensor set 1 are fused with each other and are transmitted to the determiner through sensor set 1 is possible.

Like the above description of FIG. 13, the autonomous driving control apparatus may perform the autonomous driving control operation using the fusion information, thus reducing a determination gap of the determiner. Furthermore, as an interval between pieces of input and/or output data is reduced, the autonomous driving control apparatus may perform a more accurate autonomous driving control operation.

Figure 14:
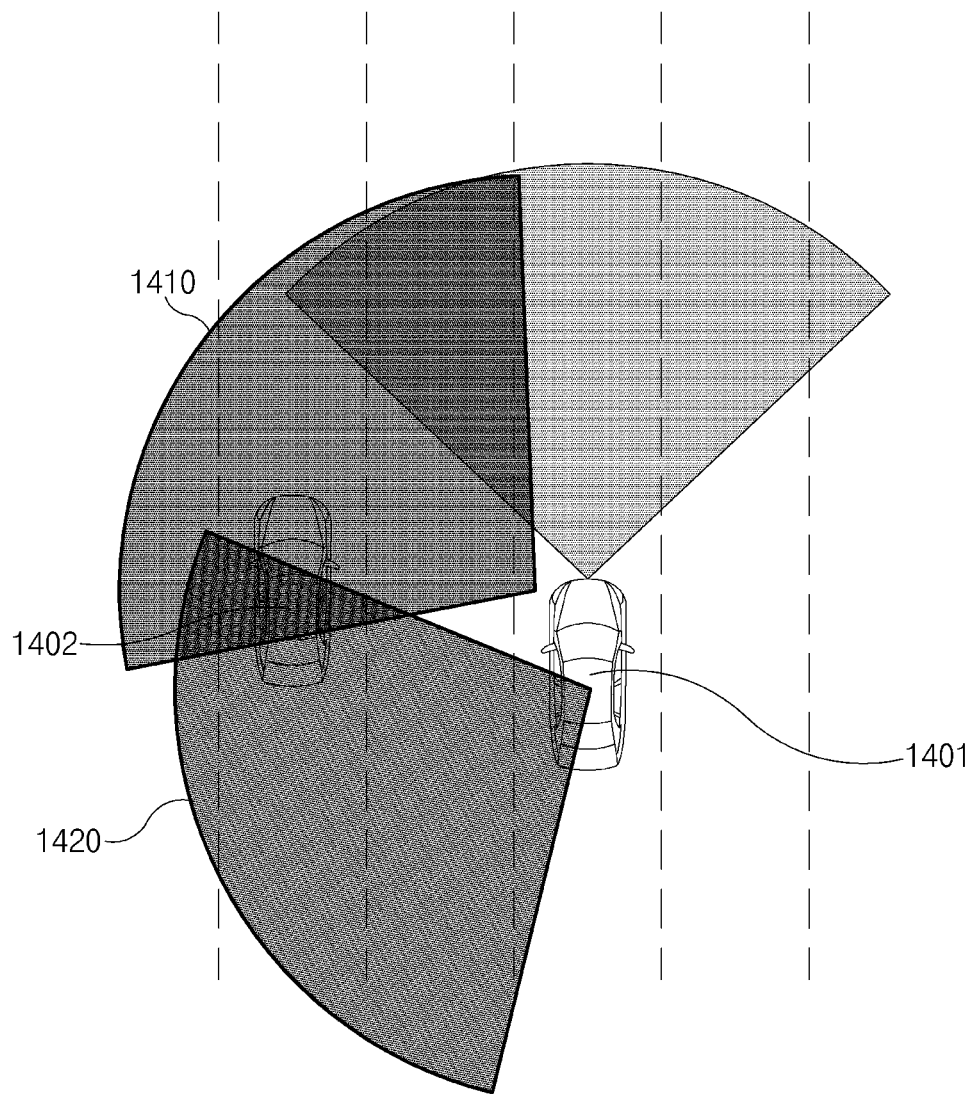
FIG. 14 is a drawing illustrating an autonomous driving determination operation performed using fusion information by an autonomous driving control apparatus according to an embodiment of the present disclosure.

FIG. 14 is a drawing illustrating an autonomous driving determination operation performed using fusion information by an autonomous driving control apparatus 1401 (e.g., an autonomous vehicle 401 of FIG. 4) according to an embodiment of the present disclosure.

A description of an operation performed by the autonomous driving control apparatus 1401 of FIG. 14 may be referred to as a data processing operation using sensor set 1, sensor set 2, determiner 1, determiner 2, and the controller of FIG. 13, which are described above.

In an embodiment, the autonomous driving control apparatus 1401 may obtain data using a plurality of sensor sets.

For example, the autonomous driving control apparatus 1401 may obtain data associated with an area corresponding to first sensor set coverage 1410 using sensor set 1.

For example, the autonomous driving control apparatus 1401 may obtain data associated with an area corresponding to second sensor set coverage 1420 using sensor set 2.

For example, the autonomous driving control apparatus 1401 may identify another vehicle 1402, based on the obtained data. As an example, the other vehicle 1402 may be overlapped and located with a portion of the first sensor set coverage 1410 and a portion of the second sensor set coverage 1420.

In an embodiment, the autonomous driving control apparatus 1401 may fuse at least a portion of data obtained using sensor set 1 with at least a portion of data obtained using sensor set 2 to generate fusion information (e.g., fusion information 1 of FIG. 13). The description of the operation where the autonomous driving control apparatus 1401 generates the fusion information may be replaced with the above description of FIG. 13.

Figure 15:
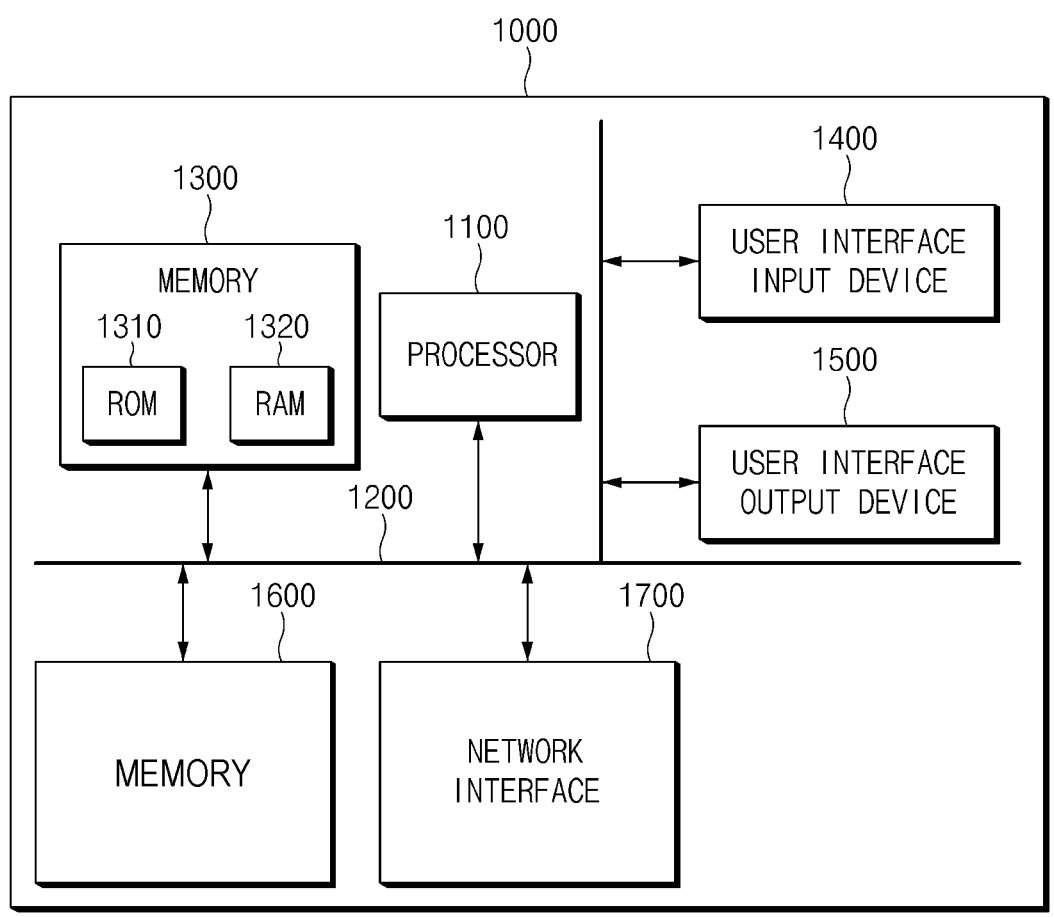
FIG. 15 is a block diagram illustrating a computing system according to an embodiment of the present disclosure.

FIG. 15 is a block diagram illustrating a computing system according to an embodiment of the present disclosure.

Referring to FIG. 15, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be given of effects of the autonomous driving control apparatus and the method thereof according to an embodiment of the present disclosure.

According to at least one of the embodiments of the present disclosure, the autonomous driving control apparatus and the method thereof may be provided to change an autonomous driving determination period of the autonomous vehicle.

Furthermore, according to at least one of the embodiments of the present disclosure, the autonomous driving control apparatus and the method thereof may be provided to efficiently perform autonomous driving control.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An autonomous driving control apparatus comprising:
a sensor device configured to obtain information around an autonomous vehicle, the sensor device comprising a plurality of sensors;
a memory configured to store information about a high definition map around the autonomous vehicle; and
a controller configured to:
classify the sensors into at least one sensor set based on the information around the autonomous vehicle and the information about the high definition map using a sensor set classification table;
monitor a computational resource utilization rate and a resource occupancy rate of the memory based on a specified period;
calculate a determiner input drop rate;
determine whether there is an available resource using the monitored computational resource utilization rate and the monitored resource occupancy rate of the memory;
determine whether to additionally allocate at least one determiner using the calculated determiner input drop rate and whether there is the available resource; and
change an autonomous driving determination period based on the at least one classified sensor set and whether the at least one determiner is additionally allocated.

2. The autonomous driving control apparatus of claim 1, wherein:
the controller is configured to configure and load the sensor set classification table based on sensor fusion domain information and classify the sensors into the at least one sensor set by applying the information around the autonomous vehicle and the information about the high definition map to the sensor set classification table; and
the sensor fusion domain information comprises information about whether there is redundancy of the sensors, a measurement period, a measurement distance, and classification information according to at least one driving situation of the autonomous vehicle.

3. The autonomous driving control apparatus of claim 2, wherein the controller is configured to:
determine whether there is the redundancy of the sensors using information about whether there is the redundancy of the sensors;
classify sensors of a first group according to a determination that there is the redundancy into different sensor sets, respectively;
identify a measurement period of the sensors; and
classify sensors of a second group identified as having a period of a specified value or less among the sensors into different sensor sets, respectively.

4. The autonomous driving control apparatus of claim 2, wherein:
the at least one sensor set comprises a first sensor set and a second sensor set; and
the controller is configured to fuse at least a portion of first data obtained using the first sensor set with at least a portion of second data obtained using the second sensor set to generate fusion information and perform an autonomous driving determination operation using the generated fusion information.

5. The autonomous driving control apparatus of claim 2, wherein the controller is configured to divide the sensors into a first sensor corresponding to a first situation among the at least one driving situation and a second sensor corresponding to a second situation different from the first situation and classify the first sensor and the second sensor into different sensor sets, respectively.

6. The autonomous driving control apparatus of claim 1, wherein the controller is configured to calculate a determiner input drop rate using a fusion number of sensor sets for processing a process, an input drop time point, and a drop data buffer, and additionally allocate the at least one determiner when the calculated determiner input drop rate is greater than a specified value.

7. The autonomous driving control apparatus of claim 1, wherein the controller is configured to determine that there is the available resource when the computational resource utilization rate of the autonomous vehicle is less than or equal to a predetermined threshold, and additionally allocate the at least one determiner in parallel based on determining that there is the available resource.

8. The autonomous driving control apparatus of claim 1, wherein the controller is configured to determine that there is the available resource, when the resource occupancy rate of the memory is less than or equal to a predetermined threshold, and additionally allocate the at least one determiner in parallel based on determining that there is the available resource.

9. The autonomous driving control apparatus of claim 1, wherein the controller is configured to process a first process and a second process in parallel using a plurality of determiners including a first determiner and a second determiner based on whether the at least one determiner is additionally allocated, and transmit first output data through the first process and second output data through the second process to the memory and an external device.

10. The autonomous driving control apparatus of claim 9, wherein:
the controller is configured to process the first output data using the first determiner based on receiving the second output data from the external device; and
a first determination period of the first determiner is greater than a second determination period of the second determiner.

11. An autonomous driving control method comprising:
obtaining information around an autonomous vehicle;
classifying at least one sensor into at least one sensor set based on the information around the autonomous vehicle and information about a high definition map around the autonomous vehicle using a sensor set classification table;
monitoring a computational resource utilization rate of a controller and a resource occupancy rate of a memory based on a specified period;
calculating a determiner input drop rate and determining whether there is an available resource using the monitored computational resource utilization rate and the monitored resource occupancy rate of the memory;
determining whether to additionally allocate at least one determiner using the calculated determiner input drop rate and whether there is the available resource; and
changing an autonomous driving determination period based on the at least one classified sensor set and whether the at least one determiner is additionally allocated.

12. The autonomous driving control method of claim 11, wherein classifying the at least one sensor into the at least one sensor set comprises:
configuring and loading the sensor set classification table based on sensor fusion domain information, wherein the sensor fusion domain information comprises information about whether there is redundancy of the at least one sensor, a measurement period, a measurement distance, and classification information according to at least one driving situation of the autonomous vehicle; and
classifying the at least one sensor into the at least one sensor set by applying the information around the autonomous vehicle and the information about the high definition map to the sensor set classification table.

13. The autonomous driving control method of claim 12, wherein classifying the at least one sensor into the at least one sensor set further comprises:
determining whether there is the redundancy of the at least one sensor using information about whether there is the redundancy of the at least one sensor; and classifying sensors of a first group based on a determination that there is the redundancy of the at least one sensor into different sensor sets, respectively.

14. The autonomous driving control method of claim 12, wherein classifying the at least one sensor into the at least one sensor set further comprises:
identifying a measurement period of the at least one sensor; and
classifying sensors of a second group identified as having a period of a specified value or less among the at least one sensor into different sensor sets, respectively.

15. The autonomous driving control method of claim 12, wherein classifying the at least one sensor into the at least one sensor set further comprises:
dividing the at least one sensor into a first sensor corresponding to a first situation among the at least one driving situation and a second sensor corresponding to a second situation different from the first situation; and
classifying the first sensor and the second sensor into different sensor sets, respectively.

16. The autonomous driving control method of claim 11, wherein determining whether to additionally allocate the at least one determiner comprises:
calculating the determiner input drop rate using a fusion number of sensor sets for processing a process, an input drop time point, and a drop data buffer; and
additionally allocating the at least one determiner when the calculated determiner input drop rate is greater than a specified value.

17. The autonomous driving control method of claim 11, wherein determining whether to additionally allocate the at least one determiner comprises:
determining that there is the available resource when the computational resource utilization rate of the autonomous vehicle is less than or equal to a predetermined threshold; and
additionally allocating the at least one determiner in parallel based on determining that there is the available resource.

18. The autonomous driving control method of claim 11, wherein determining whether to additionally allocate the at least one determiner comprises:
determining that there is the available resource when the resource occupancy rate of the memory is less than or equal to a predetermined threshold; and
additionally allocating the at least one determiner in parallel based on determining that there is the available resource.

19. The autonomous driving control method of claim 11, further comprising:
processing a first process and a second process in parallel using a plurality of determiners comprising a first determiner and a second determiner based on whether the at least one determiner is additionally allocated; and
transmitting first output data through the first process and second output data through the second process to the memory and an external device.

20. The autonomous driving control method of claim 19, further comprising processing the first output data using the first determiner based on receiving the second output data from the external device, wherein a first determination period of the first determiner is greater than a second determination period of the second determiner.

* * * * *